(12) United States Patent
Holness et al.

(10) Patent No.: US 7,499,407 B2
(45) Date of Patent: *Mar. 3, 2009

(54) SYSTEM AND METHOD FOR MANAGING AN OPTICAL NETWORKING SERVICE

(75) Inventors: Marc Holness, Ottawa (CA); Donald Russell Ellis, Ottawa (CA); Paul Littlewood, Duluth, GA (US); Malcolm Betts, Kanata (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 52 days.

This patent is subject to a terminal disclaimer.

(21) Appl. No.: 10/666,372

(22) Filed: Sep. 19, 2003

(65) Prior Publication Data

US 2004/0114924 A1 Jun. 17, 2004

Related U.S. Application Data

(60) Provisional application No. 60/412,135, filed on Sep. 20, 2002.

(51) Int. Cl.
*H04L 12/26* (2006.01)
*H04L 1/00* (2006.01)
*H04J 3/14* (2006.01)
*H04J 1/16* (2006.01)

(52) U.S. Cl. ............. 370/242; 370/236.1; 370/236.2; 370/241.1; 370/907

(58) Field of Classification Search ............. 370/254, 370/255, 252, 249, 236–236.2, 241, 1, 242, 370/907; 398/33, 58, 166
See application file for complete search history.

(56) References Cited

U.S. PATENT DOCUMENTS

| | | | | |
|---|---|---|---|---|
| 5,042,027 A | * | 8/1991 | Takase et al. | 370/252 |
| 5,768,255 A | * | 6/1998 | Brownmiller et al. | 370/248 |
| 5,796,723 A | * | 8/1998 | Bencheck et al. | 370/252 |
| 5,914,794 A | * | 6/1999 | Fee et al. | 398/20 |
| 6,005,694 A | * | 12/1999 | Liu | 398/6 |
| 6,192,031 B1 | * | 2/2001 | Reeder et al. | 370/230 |
| 6,222,848 B1 | | 4/2001 | Hayward et al. | |
| 6,366,563 B1 | * | 4/2002 | Weldon et al. | 370/252 |
| 6,594,047 B1 | * | 7/2003 | Ballintine et al. | 398/79 |
| 6,650,646 B1 | * | 11/2003 | Galway et al. | 370/397 |
| 6,681,232 B1 | * | 1/2004 | Sistanizadeh et al. | 707/104.1 |
| 6,701,086 B1 | * | 3/2004 | Heiles | 398/30 |

(Continued)

OTHER PUBLICATIONS

Non-final Office Action for U.S. Appl. No. 10/741,909 dated Aug. 24, 2007; 15 pages.

*Primary Examiner*—Ronald Abelson

(57) ABSTRACT

Described are a system and method for managing a service across an optical network over a dedicated circuit between a first and second service termination points. Each service termination point generates a service performance report message. Each service performance report messages has information related to a performance of the service as determined by the service termination point generating the message. The service termination points exchange the service performance report messages over a service management channel to enable an assessment of the performance of the service based on the service performance report messages from both service termination points. Through access to and use of the service management channel, service providers can implement an edge management model or a core management model for measuring the performance of their services with respect to service level agreements governing those services.

9 Claims, 15 Drawing Sheets

U.S. PATENT DOCUMENTS

| | | | |
|---|---|---|---|
| 6,731,648 B1 * | 5/2004 | Cotter | 370/458 |
| 6,831,890 B1 * | 12/2004 | Goldsack et al. | 370/229 |
| 6,853,619 B1 * | 2/2005 | Grenot | 370/232 |
| 6,973,096 B2 * | 12/2005 | Chappell et al. | 370/468 |
| 7,043,541 B1 * | 5/2006 | Bechtolsheim et al. | 709/223 |
| 7,065,037 B1 * | 6/2006 | Viswanathan et al. | 370/217 |
| 7,221,674 B2 * | 5/2007 | Lim | 370/390 |
| 7,289,515 B2 * | 10/2007 | Kusumoto | 370/395.41 |
| 2001/0004352 A1 * | 6/2001 | Watanabe et al. | 370/252 |
| 2002/0087696 A1 | 7/2002 | Byrnes | |
| 2002/0176450 A1 * | 11/2002 | Kong et al. | 370/539 |
| 2003/0120765 A1 | 6/2003 | Radi et al. | |
| 2003/0131028 A1 | 7/2003 | Radi et al. | |
| 2005/0071453 A1 * | 3/2005 | Ellis et al. | 709/223 |

* cited by examiner

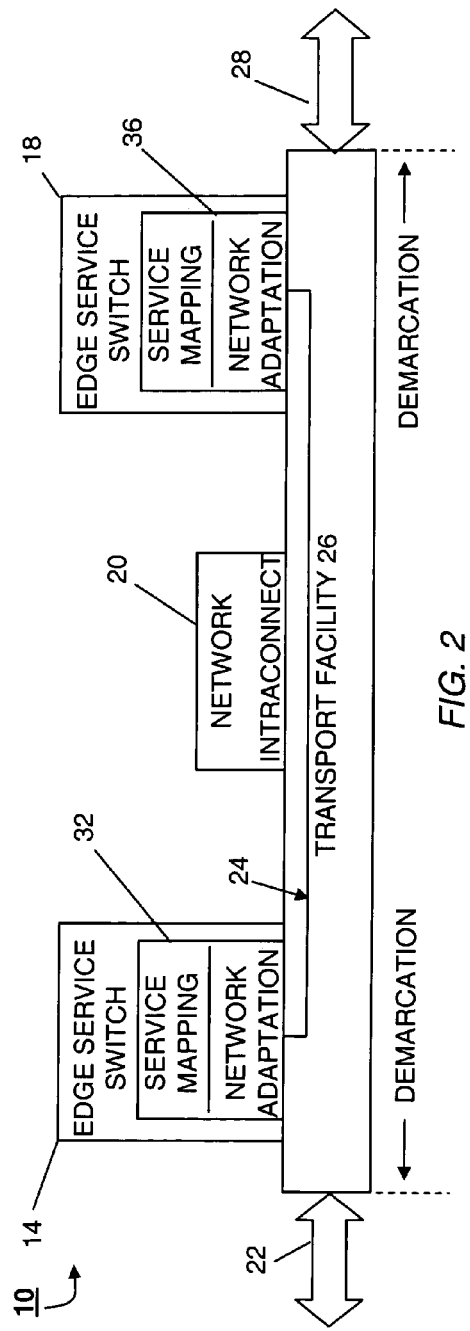
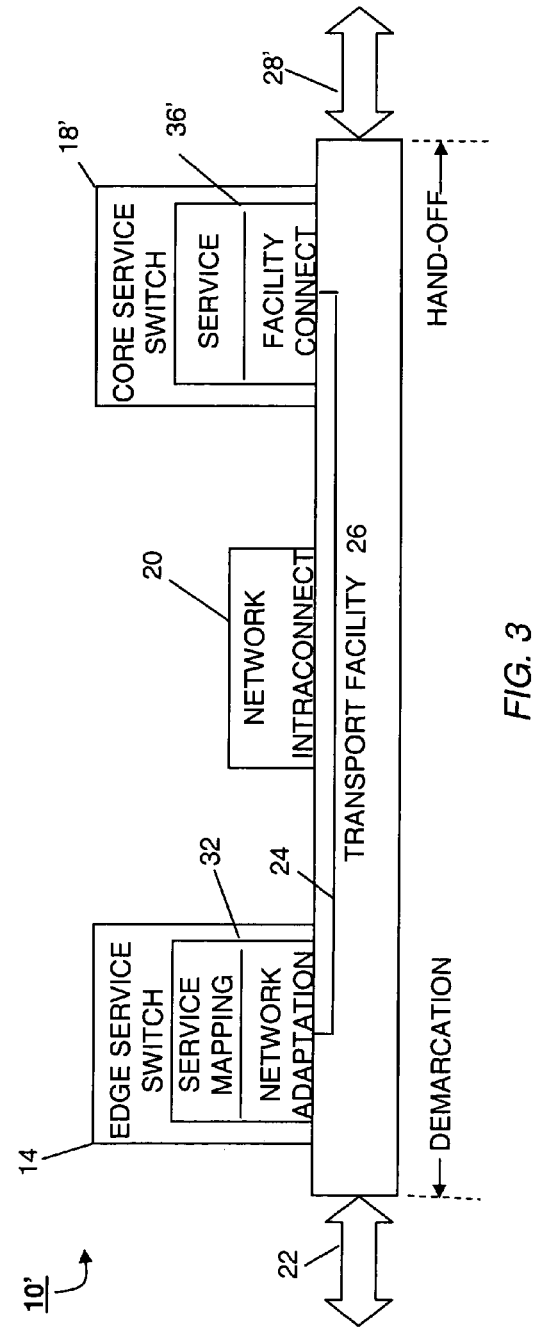

Ethernet Service Report (330)

| Byte No | 7 | 6 | 5 | 4 | 3 | 2 | 1 | 0 |
|---|---|---|---|---|---|---|---|---|
| 0 | FLAG | | | | | | | |
| 1 | SAPI | | | | | C/R | | EA |
| 2 | TEI | | | | | | | EA |
| 3 | CONTROL | | | | | | | |
| 4-19 | Destination Equipment Identifier (DEI) | | | | | | | |
| 20-51 | Service Identifier | | | | | | | |
| 52 | Reserved | | Service Type | | | Message Type | | |
| 53 | Rate Status | | | LpBk Status | | | | SS |
| 54 | Reserved | | Duplexity Status | | | Pause Status | | |
| 55-56 | Committed Information Rate | | | | | | | |
| 57-58 | Peak Information Rate | | | | | | | |
| 59 | | | | | | Unit | | |
| 60 | Burst Duration | | | | | | | |
| 61-62 | FCS | | | | | | | |
| 63 | FLAG | | | | | | | |

*FIG. 13*

Fibre Channel Service Report (340)

| Byte No | 7 | 6 | 5 | 4 | 3 | 2 | 1 | 0 |
|---|---|---|---|---|---|---|---|---|
| 0 | FLAG | | | | | | | |
| 1 | SAPI | | | | | C/R | | EA |
| 2 | TEI | | | | | | | EA |
| 3 | CONTROL | | | | | | | |
| 4-19 | Destination Equipment Identifier | | | | | | | |
| 20-51 | Service Identifier | | | | | | | |
| 52 | Reserved | | Service Type | | | Message Type | | SRV-S |
| 53 | Rate Status 342 | | | Lpbak Status | | | | |
| 54 | Provisioned Buffer Credits 346 | | | | | | | |
| 55-56 | FCS | | | | | | | |
| 57 | FLAG | | | | | | | |

*FIG. 14*

SYSTEM AND METHOD FOR MANAGING AN OPTICAL NETWORKING SERVICE

RELATED APPLICATIONS

This application claims the benefit of the filing date of co-pending U.S. Provisional Application, Ser. No. 60/412,135, filed Sep. 20, 2002, titled "Optical Broadband Service Management Framework," the entirety of which provisional application is incorporated by reference herein.

FIELD OF THE INVENTION

The invention relates generally to optical telecommunications systems. More particularly, the invention relates to a system and method for managing network services across an optical network.

BACKGROUND

Transport networks of today need to provide cost-effective transport for various types of client information, including multi-service traffic ranging from synchronous traffic (e.g., DS-1, DS-3, and STS-12) to asynchronous traffic (e.g., IP, Ethernet, and ATM). Traditionally, service providers support such services on transport networks based on synchronous optical network (SONET) or synchronous digital hierarchy (SDH). Service providers specify the services that they agree to furnish to their customers in contractual service level agreements or SLAs. Often, SLAs provide terms and parameters against which the performance of the services can be measured. Accordingly, service providers want to monitor the services that they provide to ensure that each service is performing in accordance with its corresponding SLA.

Networking technologies, such as SONET, offer service providers operations, administration, and management (OAM) capabilities for managing the performance of the transport facility. However, service providers are unable to use these current OAM capabilities to monitor services across a network because of the diversity of OAM service management techniques. Some OAM management functions occur at high-level packet switching levels such as the network layer (i.e., layer 3 or L-3) and the data link level (i.e., layer 2 or L-2), some occur at low-level transport switching such as the physical layer (i.e., layer 1 or L-1) and the optical layer (i.e., layer 0 or L-0), others occur at network-edge service control points, and still others occur at core network elements. Additionally, service providers need to be able to support link-based, end-to-end path based, and application-specific OAM models. Presently, no single technique exists for transporting, mapping, and accessing relevant service-specific OAM information across the network. To offer multi-services, service providers need a single OAM solution that can merge different technologies, such as connection-oriented and connectionless service management technologies.

Further, a service can traverse the networks of multiple carriers. However, OAM information typically does not transmit across handoff points between network carriers. As a result, OAM information is not reliably transmitted from one end of the network to another, making it impossible for a service provider to guarantee the performance and reliability of its service across the network.

Current OAM techniques also do not provide service providers with access or control points. As a result, OAM information is not accessible at the network locations where the service provider can accurately measure and charge for its service. In fact, some service providers, such as wholesale carriers, do not have a service edge that it can access to monitor a service. Another consequence of a lack of control points is the inability of service providers to isolate and segment faults adequately for commissioning and reliability purposes. In general, OAM information and control are not segmented at demarcation and hand-off points, such as at user network (UNI) and network-to-network interfaces (NNI). There is a need, therefore, for a system and method that enable service providers to monitor the performance of their services more effectively than current OAM techniques.

SUMMARY

In one aspect, the invention features a method for managing a service across an optical network over a dedicated circuit between a first and second service termination points. A service performance report message is generated at each of the service termination points. Each service performance report message has information related to a performance of the service as determined by the service termination point generating that service performance report message. The service performance report message generated by one of the service termination points is transmitted to the other service termination point over a service management channel to enable an assessment of the performance of the service based on the service performance report messages from both service termination points.

In another aspect, the invention features an optical network for supporting a service provided by a service provider over a dedicated circuit between service termination points. The optical network comprises first and second network elements. Each network element is disposed in the dedicated circuit of the service. The first network element sends a message to the second network element over an optical transport facility using a service management channel capable of carrying the message across a network-to-network interface. The messages convey information related to a performance of the service over the dedicated circuit.

The invention also features a network element connected at one end of a dedicated circuit used to carry customer traffic associated with a service. The network element comprises a client interface receiving client signals from a client network. A service management channel entity derives from the client signals information related to a performance of the service and generates a message in response to the service performance information. A transport interface, for mapping and adapting the client signals to an optical transport facility, transmits the message to a network element at the other end of the dedicated service over a service management channel capable of carrying the message across a network-to-network interface.

In yet another aspect, the invention features a network element connected between service termination points located at opposite ends of a dedicated circuit used to carry customer traffic associated with a service. The network element comprises a transport interface receiving customer traffic associated with the service. A service management channel entity processes the customer traffic received by the transport interface to access service performance information stored in a service management channel of the transport facility by one of the service termination points.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

FIG. 2 is a diagram of an embodiment of the service network of FIG. 1 in which the first and second network elements are edge service switches.

FIG. 3 is a diagram of another embodiment of a service network of FIG. 1 in which one of the first and second network elements is an edge service switch and the other is a core service switch.

FIG. 13 is a diagram of a format of an embodiment of an Ethernet service report message generated by an edge service switch in response to a command message.

FIG. 14 is a diagram of a format of an embodiment of a Fibre Channel service report message generated by an edge service switch in response to a command message.

DETAILED DESCRIPTION

The present invention features an optical broadband services (OBS) framework that combines service-specific management with transport-facility management over a service management channel. An optical network configured in accordance with this framework enables a network operator to evaluate and manage the performance of a service. Service, as used herein, is a guarantee of transport of customer-offered traffic with specific performance commitments. The service provider and possibly one or more carriers transport the customer-offered traffic over the optical network on a dedicated circuit between service-termination points. Network elements at these service-termination points measure the performance of the customer-offered traffic and exchange the performance metrics across the network. Service performance metrics are based on traffic characteristics, not container (i.e., facility) characteristics.

The network operator accesses the performance metrics from a network element at a service termination point (i.e., at a network edge) or at an interior point in the network. In accordance with the principles of the invention, the accessed network element is capable of communicating service-related messages over the service management channel. From the information gathered at the access point, the network operator is able to determine whether the performance of the service is complying with parameters set forth in a service level agreement (SLA). The network operator can also perform other service-related operations, such a service commissioning and testing.

The OBS framework can support a variety of services. Examples of supported services include, but are not limited to, a) asynchronous broadband private line services, such as DS0, DS1, DS3, E1, and E3 private line, b) SONET/SDH services, such as SONET/SDH private line, OC-n (where n=3, 12, 48, or 192), STM-n (where n=1, 4, 16, or 48), and traditional synchronous payload envelopes (SPEs) including synchronous transport signals STS-1 , STS-3c and VC4, c) local area network (LAN) and storage area network (SAN) services, such as Ethernet Private Line (full and variable rate using Generic Framing Procedure—Full/Transparent (GFP-F/T)) and Storage Private Line services such as Fiber Channel Private Line (Full and Variable Rate using GFP-F/T), and d) managed wavelength services, such as Open Private Line (high-definition television (HDTV), SONET/SDH, LAN/SAN), Transparent 8 B/10 B Private Line services such as Enterprise System Connection (ESCON), DVB-ASI, FC-100, 1 GbE, ISC, and OC-n transparency (2.5 G and 10 G), such as ODU-OTN networking and G.Modem (sync TPM).

The following description refers primarily to Synchronous Optical Network (SONET) as the optical infrastructure over which the service management channel of the invention carries service-related messages, but the invention applies also to other optical standards, such as Synchronous Digital Hierarchy (SDH) and Optical Transport Network (OTN).

Figure 1:
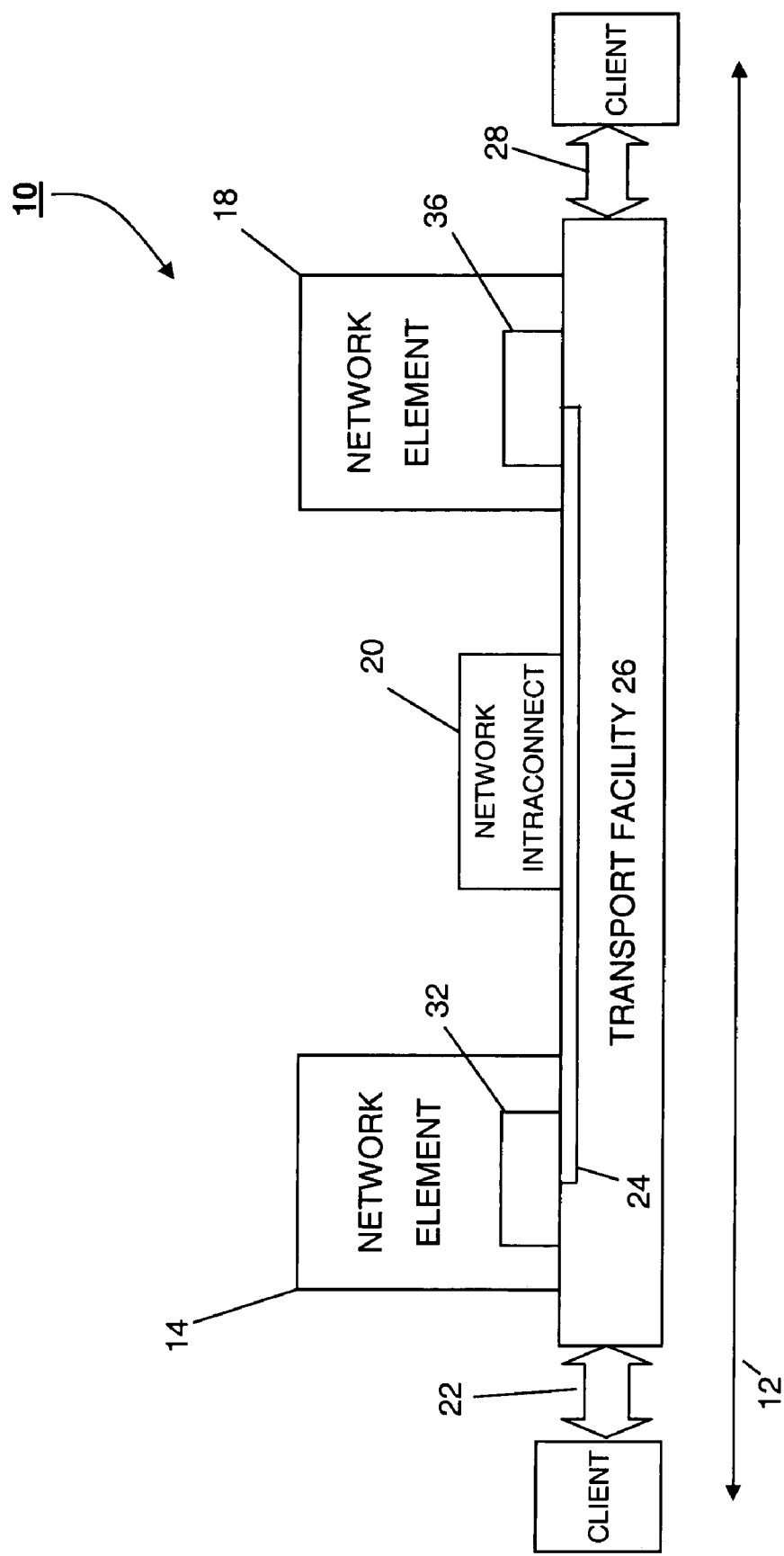
FIG. 1 is a diagram of an embodiment of an optical network including a first network element in communication with a second network element through a network intra-connect element over a transport facility.

FIG. 1 shows a general embodiment an optical network 10 constructed in accordance with the principles of the invention. A service provider or carrier uses the optical network 10 to support a service purchased by a customer under terms governed by an SLA. Customer traffic pertaining to the service travels from one end of the network 10 to another end of the network 10 over a dedicated circuit or path 12. As used herein, the term end-to-end refers to the service or service path (i.e., client-to-client or customer-to-customer). The path 12 includes a first network element 14 in communication with a second network element 18 through a network intra-connect element 20. The network elements 14, 18 exchange service-related messages with each other through a service management channel (SMC) 24 over a transport facility 26.

Each network element 14, 18 is in communication with a respective interface 22, 28 and includes respective software 32, 36 for performing the particular functions of that network element and for processing the service-related messages conveyed by the SMC 24. Types of network elements that are configured to communicate service-related messages over the SMC 24 include service demarcation points (i.e., service termination or end points) and carrier hand-off points (i.e., interior network devices). Implementations of the SMC 24 include using 1) the path overhead (POH) of SONET STS frames or of SDH virtual containers (VC), and 2) client management frames of Generic Framing Procedure (GFP), as described in more detail below.

The network intra-connect element 20 primarily performs facility switching functions for traffic between the network elements 14, 18. Although in the path of the service, the network intra-connect element 20 does not process the service-related messages in the SMC 24. Similar to digital cross-connects systems, the network intra-connect element 20 functions without regard to the type of customer traffic passing through. The transport facility 26, generally, is a transport mechanism for carrying the communications among the network elements 14, 18, 20 and interfaces 22, 28. Although a transport facility is typically within the network of a single service provider or carrier, the transport facilities of multiple carriers may be needed to support the service between service termination points. Communication over the transport facility 26 occurs according to a standard for synchronous data transmission over fiber optic networks, such as SONET, SDH, or OTN.

During operation, the network elements 14, 18 use the SMC 24 to perform varying degrees of service processing. The SMC 24 enables a network operator of a service provider, who has access to one of the network elements 14, 18, to manage, monitor, and test the services supported by the service provider, as described in detail below. Service processing includes 1) service monitoring and managing; 2) service commissioning and service connectivity testing; and 3) traffic switching based on service-specific parameters (i.e., protection switching), which are described in more detail below. The capabilities provided by the SMC 24 can be supplemental to existing OAM functions for supporting the service, e.g., MAC OAM frames and GFP OAM frames, and facility-based connection management capabilities, e.g., Tandem Connection Monitoring (TCM) and Internet Protocol Performance Metrics (IPPM). Tandem Connection Monitoring, for example, uses a facility channel (i.e., the N1 byte of the POH) to manage network facilities that support the service.

Edge Management Model

FIG. 2 shows an embodiment of the optical network 10, in which the first and second network elements 14, 18 are service termination points (hereafter, each referred to as an edge service switch or an ESS). An ESS is a network device that interfaces with a client network, interprets client signals, and performs carrier network adaptation functions and service mapping functions. Depending upon the type of service supported, client signals may be protocol-data-unit- or PDU-oriented, such as IP/PPP or ETHERNET MAC, block-oriented code, such as Fibre Channel or ESCON, or a constant bit rate stream. Generally, edge service switches embody User Network Interfaces (UNIs). In one embodiment, the ESSs 14, 18 both belong to the same carrier network. In another embodiment, the ESS 14 is part of a different carrier network than the ESS 18.

Through the respective interfaces 22, 28, each ESS 14, 18 communicates with the equipment of the client network. The point at which each ESS 14, 18 communicates with the respective interface 22, 28 is denoted in FIG. 2 as a service demarcation point. Each demarcation point represents a point in the network 10 at which the customer is granted access to the network 10 and to the service being offered by the service provider. As used herein, edge-to-edge refers to the service or service path within a single carrier (i.e., from demarcation point to demarcation point).

Through execution of the respective software 32, 36, each ESS 14, 18 performs service mapping functions and network adaptation functions. Service mapping functions include 1) providing service (i.e., customer or client) interface and interface options, 2) performing service encapsulation, 3) service monitoring, and 4) providing protection options. Network adaptation, in general, reshapes traffic from higher-layer client signals for transmission over the transport facility 26. More specifically, network adaptation functions include 1) producing common network containers (i.e., common networking attributes offered by the network technology), 2) aggregating and transporting signals, 3) establishing an end-to-end path/connection, 4) performing facility management, and 5) performing network element management. For example, network adaptation for SONET uses STS-n payload envelopes (SPE) to manage connectivity and to provide multiplexing, aggregation, and overhead information for networking and management.

During operation, each ESS 14, 18 generates and transmits service performance report messages (PRMs) over the SMC 24 and performs service monitoring in accordance with the principles of the invention. Performance report messages are scheduled messages; that is, each ESS 14, 18 generates a PRM periodically (e.g., once per second). In general, PRMs inform the source ESS (i.e., transmitter of optical signals) of transmission errors received by the sink ESS (i.e., recipient of optical signals) and communicate service-specific information.

To generate the PRMs, each ESS 14, 18 gathers service performance statistics and facility (i.e., link or transport) performance statistics and incorporates both types of statistics into the periodically generated PRMs. For example, for a typical Ethernet private line service, facility/link performance metrics can include errored framed seconds (EFS) and severely errored frame seconds (SEFS), and service statistics can include packet throughput, packet access bandwidth, and packet drop rate. Examples of format and content of PRMs are described below.

When transmitting PRMs, the source ESS maps and adapts the service signal, including the PRMs, into an optical signal to be transported over the optical facility 26. The source ESS places the PRMs into the SMC 24 of the optical signal. Preferably, the SMC 24 is implemented in the POH of the SDH VC or SONET SPE (i.e., at L-1). In another embodiment, the SMC 24 is implemented at the GFP layer.

The source ESS does not target the PRMs to any remote network element in particular. The PRMs generated by ESS 14 traverse the transport facility 26 and are received by the ESS switch 18. Similarly, the PRMs generated by the ESS 18 traverse the transport facility 26 and are received by the ESS 14. The ESSs 14, 18 store the PRMs received from the other ESS during a specified period, and collectively analyze those PRMs. Thus, each ESS 14, 18 possesses service performance data from both end points of the service and can monitor the performance of the service by comparing the statistics gathered at both service ends.

This service monitoring capability enables service providers to apply an "edge management model" to manage its services. More specifically, a service provider with access to one of the ESSs 14, 18 can measure the performance of the service against terms set forth in the SLA with the customer of that service. The service provider can be assured of the service's compliance with the SLA or, in the event of a degrading service, can take proactive steps to comply with the SLA.

Core Management Model

The service typically passes over the transport facility 26 of the service provider through a core network in the optical network of the service provider or of another carrier. In accordance with the principles of the invention, a network element at an intermediate point in the service path can monitor the service and facility performance metrics. FIG. 3 shows another embodiment of an optical network 10' in which the first network element 14 is an ESS and the second network element 18' is situated at an intermediate point between service termination points. Here, the ESS 14 is one of the service termination points and a second service termination point is not shown. Edge service switches are described above in connection with FIG. 2.

The intermediate network element 18', hereafter referred to as a core service switch or CSS, is capable of processing information conveyed by the SMC 24 and combines facility connect functions with service processing functions. The CSS 18' accomplishes these functions through the execution of the software 36'. Service processing functions of the core service switch 18' include 1) service management, 2) service commissioning, 3) service monitoring, 4) service testing, and 5) local and remote operations, administration, maintenance and processing (OAM&P).

The CSS 18' communicates with a network inter-connect device 28' situated at a point in the network 10' referred to as a network or carrier handoff. The network handoff is a point at which the customer traffic traverses different transport facilities or different carriers. Typically, the network inter-connect device 28' has open standard, L-1 aggregated (OC-n), and L-2 aggregated interfaces (I/F), and performs link management and intermediate service and facility monitoring.

The CSS 18' serves as a portal for monitoring the service between the service termination points, and enables service providers to apply a "core management model" for the management of its services. Because the CSS 18' is an intermediate point in the service path, the network operator can use the CSS 18' to intercept the service PRMs generated by the ESSs and collect historical performance information (i.e., service monitoring). Like the ESS 14, the CSS 18' can accumulate and store the information for a predetermined length of time. With the accumulated information, a network operator can evaluate the performance of the service against an SLA. Also, the network operator can use the CSS 18' as a portal to perform service commissioning, to manage the ESSs, and to potentially switch traffic based on the service information. Some service providers may want to support the edge management model, whereas others may want to support the core management model, and still other service providers may employ both.

A network can have more than one interior network element (such as the CSS 18') that can process information in the SMC 24. These interior network elements serve as a plurality of performance monitoring points at different locations along the network. Consequently, a network operator with access to the various monitoring points can localize an error (i.e., fault isolation) occurring within the network by examining information gathered at each of the monitoring points.

During operation, the CSS 18' of the optical network 10' performs service monitoring in accordance with the principles of the invention. An exchange of PRMs occurs between a near-end switch (here, the ESS 14) and a far-end edge service switch (not shown). As described above in connection with FIG. 2, the SMC 24 carries the PRMs between the service termination points. In the exchange between service termination points, the PRMs pass through the CSS 18'. The CSS 18' has a protocol stack that can process the SMC 24 and forward received signals towards their destinations.

To support core management, each ESS uses all STS paths that make up the connection to dispatch the service PRMs. This simplifies monitoring of PRMs at the CSS 18', especially during protection events, because the CSS 18' needs to monitor only one path (per service). The CSS 18' can select or deselect which paths are being actively monitored at any given point in time. Like the ESS 14, the CSS 18' can extract the messaging from the SMC 24. In the case of the CSS 18', the contents of the SMC 24 are mirrored (i.e., a drop and continue function) and passed to a service monitoring function (i.e., a software-based capability possessed by switches 14, 18'). Accordingly, a service provider or carrier with access to the CSS 18', like a service provider with access to the ESS 14, has access to PRMs from both service termination points. Thus, the service provider can monitor the service performance by comparing statistics gathered at both service termination points and measure the performance of the service against the SLA with the customer of that service.

To commission or test the service, the ESS 14 and the CSS 18' of the optical network 10' can issue service commands over the SMC 24 in accordance with the principles of the invention. In one embodiment, the CSS 18' and ESSs can initiate a service command, but only ESSs can respond to a service command. The network operator inserts service commands (e.g., loopback, service query) into the SMC 24 at either the ESS 14 or at the CSS 18', and directs the service command to one of the ESSs.

Edge Service Switch

Figure 4:
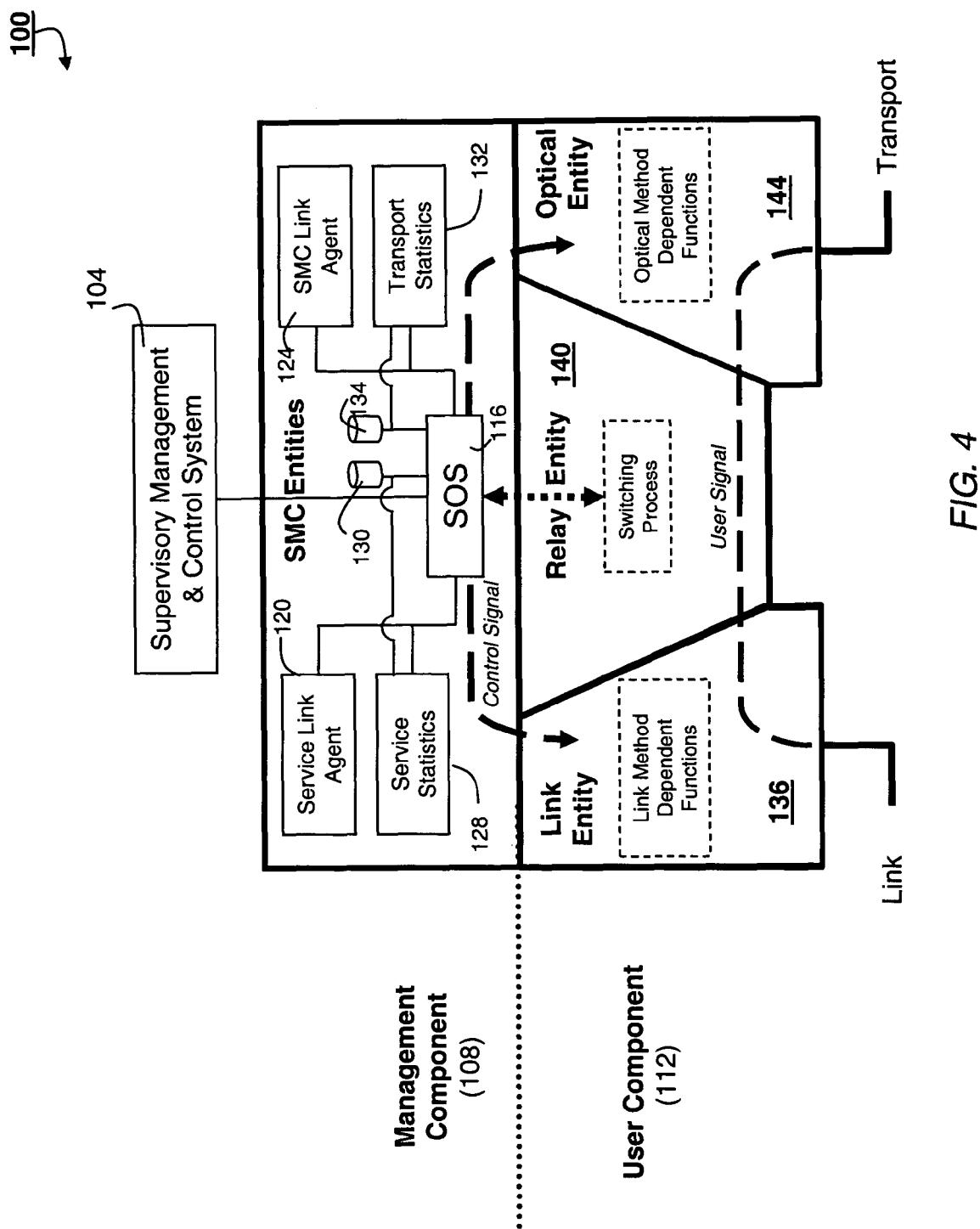
FIG. 4 is a block diagram of an embodiment of an edge service switch.

FIG. 4 shows a functional diagram of an ESS 100 of the invention. In general, the ESS 100 is an optical network element that relays client signals (like a digital cross-connect) and performs SMC functions. The ESS 100 includes a supervisory management and control system 104, a management component 108, and a user component 112. A network operator inserts commands into the SMC 24 through the supervisory management and control system 104.

The management component 108 includes software for performing SMC processing, and the user component 112 includes software for switching client signals (i.e., customer-offered traffic related to the service) to the appropriate optical transport port. The user component 112 corresponds to the facility-switching portion of the network element ESS 100. More specifically, the user component 112 logically includes a link entity 136, a relay entity 140, and an optical entity 144. The link entity 136 performs link-method dependent functions and passes link statistics (e.g., FCS errors) to the management component 108, specifically a SMC OAM Source/Sink (SOS) agent 116. Client signals pass through the relay entity 140 for forwarding (i.e., a switching process) to the optical entity 144. The switching process passes packet count metrics (e.g., frames received, sent, throughput) to the SOS agent 116. Also passed to the SOS agent 116 are SMC commands. The optical entity 144 performs optical-method dependent functions, such as network adaptation (e.g., GFP, STS) and service mapping.

The management component 108 logically includes the SOS agent 116, service-link agent 120, a SMC-link agent 124, a service-statistics agent 128, and a transport-statistics agent 132.

The SOS agent 116 performs functions such as 1) processing all SMC commands and responses, 2) translating commands into network element actions (e.g., loopback), 3) generating scheduled service PRMs and unscheduled priority messages based on reads and event triggers from the databases, 4) extracting statistics from SMC messages and writing such statistics to the appropriate database, and 5) extracting far-end statistics from service OAM messages and writing such statistics to the appropriate database. To perform such SMC operations, the SOS agent 116 interacts with the link agents 120, 124 and the statistic agents 128, 132. The SOS agent 116 also interfaces with the supervisory management and control system 104 and manages interactions between service link OAM signals and the SMC 24.

The service link agent 120 handles the termination of service OAM messages and schedules service OAM messages; the SMC link agent 124 handles the termination of SMC messages and schedules SMC messages to be dispatched. The SMC link agent 124 also extracts the contents from the SMC 24 and sends the contents to the SOS agent 116.

The service statistics agent 128 maintains a repository or database 130 of client-specific link statistics. The service statistics agent 128 can interact with the SOS agent 116 to process service PRMs that have information derived from the service statistics. Examples of service statistics (for an Ethernet client, for example) are frame coding sequence (FCS) errors and coding violations. The transport-statistics agent 132 maintains a repository or database 134 of optical transport-specific statistics. The transport statistics agent 132 can interact with the SOS agent 116 to process service PRMs that have information derived from the transport statistics. The service-specific database 130 stores information such as L-2 statistics (e.g., IEEE 803.1 MIB) and link OAM (e.g., IEEE P802.3ah EFM OAM) information. These given examples are specific to an Ethernet service. The type of service-specific information depends upon the type of service being monitored. The transport database 134 stores information such as GFP statistics (e.g., discarded frame counts), STS statistics (e.g., B3 error count) and equipment statistics (e.g., GFP ASIC integrity failures).

Core Service Switch

Figure 5:
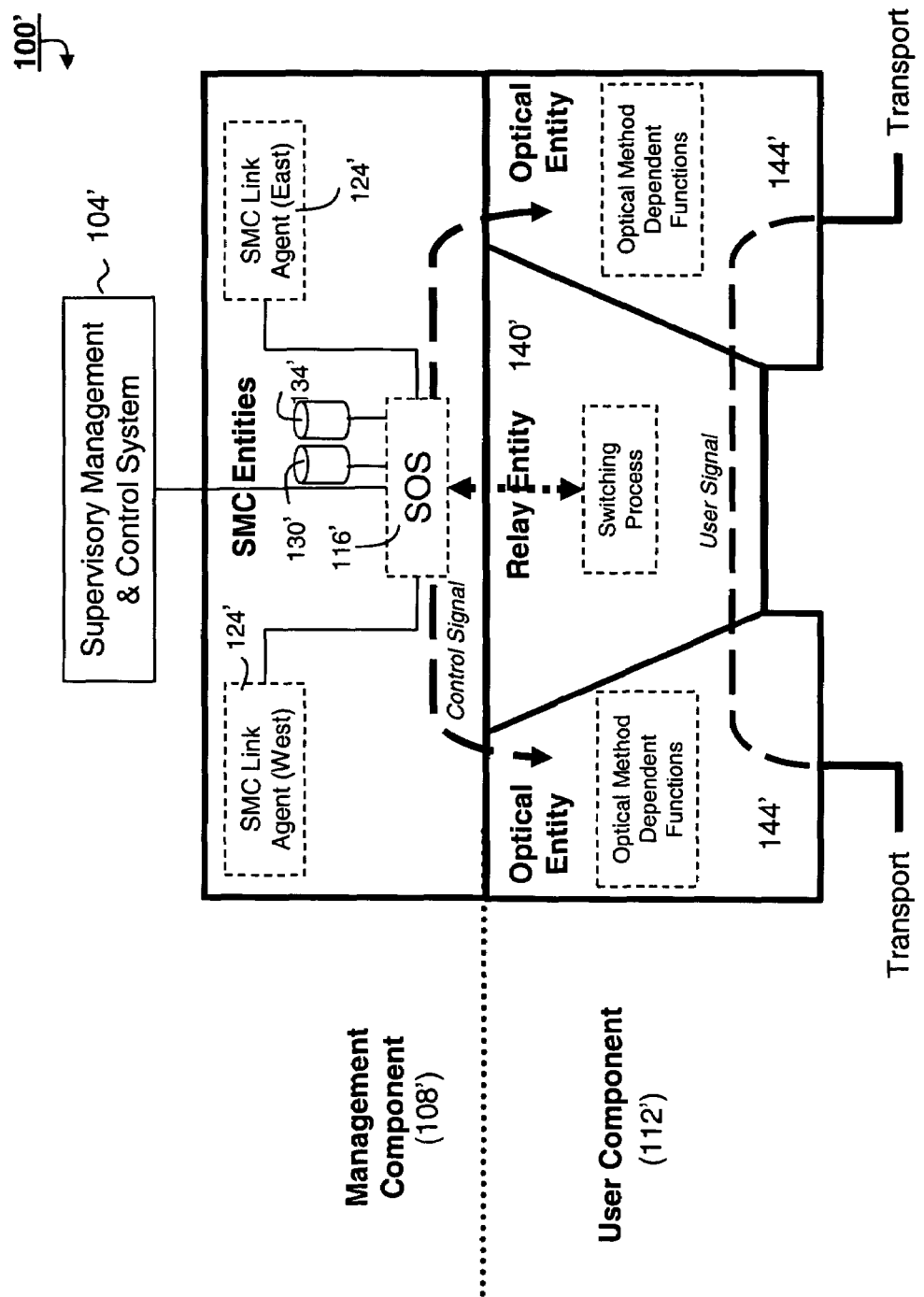
FIG. 5 is a block diagram of an embodiment of a core service switch.

FIG. 5 shows a functional diagram of a CSS 100' of the invention. Like the ESS 100 of FIG. 4, the CSS 100' is also an optical network element that relays client signals and performs SMC functions. The CSS 100' includes a supervisory management and control system 104', a management component 108', a user component 112', and maintains databases 130', 134' similar to those corresponding databases maintained by the ESS 100. In general, the functionality of the control system 104', management component 108', and user component 112' are similar to the corresponding features of the ESS 100, with the following noted differences. Statistics are collected at the edges of the network, not in the network core. Accordingly, the management component 108' of the CSS 100' lacks statistics agents, such as the service-statistics agent 128 and the transport-statistics agent 132 of the ESS 100. Also, the CSS 100' forwards traffic between optical transport facilities or networks, in contrast to the ESS 100 which interfaces between the client link and the transport facility. Accordingly, the user component 112' of the CSS 100' includes an optical entity 144' and the management component 108' includes an SMC link agent 124' for each transport interfaced. Further, the CSS 100' lacks a service link agent and link entity, such as the service link agent 120 and link entity 136 of the ESS 100.

SMC-Enabled Capabilities

Generally, the SMC carries three types of messages: 1) priority code messages, 2) command-and-response messages, and 3) service PRMs. Priority code and command-and-response messages are unscheduled messages, whereas service PRMs are scheduled messages. With the use of these messages, a network operator with access to an SMC-enabled ESS or CSS can perform a variety of functions, some of which have been briefly described above. The functions include two broad categories: 1) service surveillance and 2) service commissioning and testing.

The first category, service surveillance, has two components: alarm or status monitoring and performance monitoring. Alarm or status monitoring is a process of tracking failure events to build an understanding of the overall transmission performance of a network element. Performance monitoring is a process of continuous collection, analysis, and reporting of performance data associated with the transmitting network element.

With regard to alarm or status monitoring, the first component of service surveillance, one capability of the SMC is for carrying alarm signals. Categories of alarms carried over the SMC include network facility alarms and service alarms. For a service carried over a SONET network, SONET maintenance signals can be used. For example, a remote alarm indication (RAI) signal and an alarm indication signal (AIS) are examples of SONET alarm signals that can be transmitted over the SMC 24. RAI signals travel upstream (i.e., towards the source of the incoming signal) when SONET terminal equipment determines that the incoming signal is effectively lost. AIS signals travel downstream to a SONET network element upon a loss of incoming SONET signal (e.g., loss of signal or LOS, Internal Equipment Failure), or when an action occurs that can cause a service disruption (e.g., a loopback). The AIS is removed when the triggering condition terminates.

The SMC 24 can also be used to carry service-specific alarm signals. Examples of service alarms include a client signal failure (CSF) signal and a service remote fault (SRF) signal. When an ESS detects a loss of client signal (e.g., because of a customer link fiber cut), the ESS transmits downstream a CSF signal to the far-end ESS. Upon receiving the CSF signal, the far-end ESS raises a far-end client signal fail alarm. After the loss of client signal event clears (e.g., because the cut fiber is repaired), the near-end ESS stops transmitting the CSF signal, the LOS alarm at the near-end is cleared, and then the far end client signal fail alarm at the far-end edge service switch is cleared.

Upon detecting a network adaptation or mapping failure (e.g., the loss of GFP frame delineation), an ESS transmits an SRF signal upstream to the far-end ESS. The near-end ESS then periodically generates SRF signals destined to the far-end ESS. Upon receiving an SRF signal, the far-end ESS raises an alarm and performs procedures to shut down the customer link. When the network adaptation or mapping failure clears, the near-end ESS stops sending SRF signals to the far-end ESS. As a result, the near-end and far-end ESS re-establish their respective customer links.

With regard to service performance monitoring, the second component of service surveillance, a capability of the SMC is for carrying the periodic exchange of service PRMs between service termination points (i.e., the ESSs). The format of these service PRMs is service specific, and the contents of the service PRMs are designed to support the governing SLA. Intermediate points within the network, i.e., CSSs, monitor end-to-end status of the service based on the service performance information in these service PRMs.

Counts of certain events are accumulated during each interval. These event counts serve as the performance information put into a PRM. Examples of types of events for inclusion in a service PRM are service error events, transmitted and received packets, packet throughput, service status (e.g., in-service, out-of-service), and service protection events. The particular events captured are identified as those that support a determination of whether the service is performing in accordance with the particular SLA.

The second category of SMC-provided capabilities, service commissioning and testing, features processes by which the network operator can perform out-of-service testing, such as testing service connectivity, checking service configuration, and provisioning a service at a remote site. Service commissioning functions include loopback and service diagnostics. Network operators can use the SMC to perform loopback operations between the network of the service provider and the customer interface, or between carrier hand-off points. As a consequence, network operators can verify sectional connectivity of the network.

Figure 6:
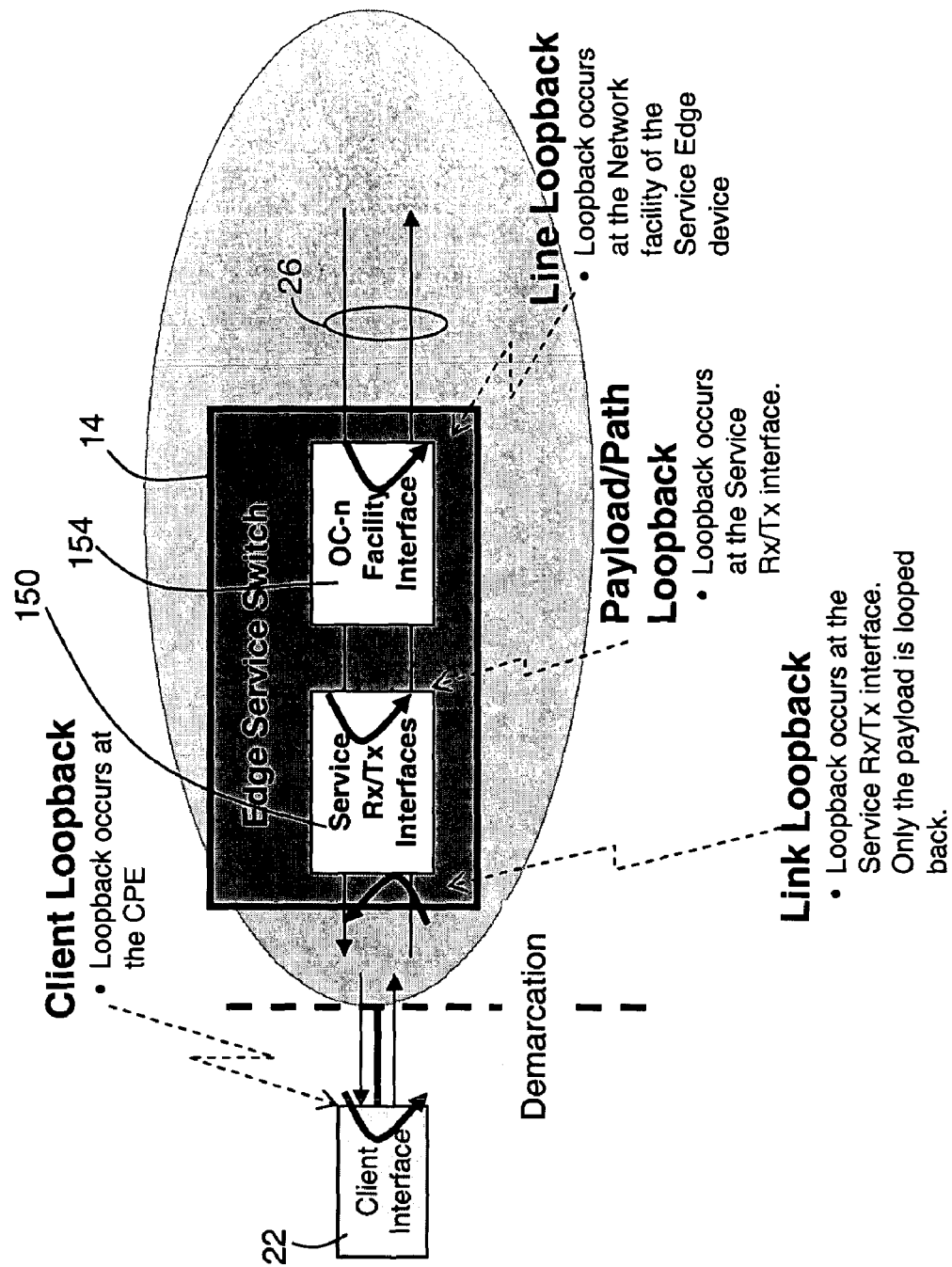
FIG. 6 is a diagram illustrating various loopback conditions useful for connectivity verification and fault isolation.

The loopback function, for instance, permits verifications of connectivity at various points along the dedicated path of the service before activation of the service to determine whether the network can transport packet information. In addition, in the event of service interruptions, the loopback function can be used to check connectivity to isolate failure points. FIG. 6 illustrates the various types of loopback conditions that a network operator can configure using the SMC to verify connectivity or perform fault isolation. As shown, the ESS 14 is in communication with the client interface 22. The ESS 14 has service receive-transmit interfaces 150 in communication with the client interface 22 and an OC-n facility interface 154 in communication with the transport facility 26. Types of loopback conditions shown are client loopback, link loopback, payload/path loopback, and line loopback.

Client loopback occurs at the client interface (i.e., the customer equipment) 22. Link loopback occurs at the client side of the service receive-transmit interfaces 150. For link loopback, only the payload is returned (i.e., looped back to the sender). Payload/path loopback occurs at the network side of the service receive-transmit interfaces 150, and line loopback occurs at the transport facility 26. With these various loopback options, a network operator at the CSS 18' (FIG. 3) can signal the ESS 14 to enter a loopback state over the SMC 24. When in this state, the ESS 14 loops the signal from the transmission path to the receive path. Consequently, the transmission of the carrier signal to the client interface 22 experiences an interruption.

Also before service activation, the network operator can verify that the service configurations at the ESS are consistent with each other. By querying each service termination point (i.e., ESS) over the SMC 24, the network operator uses service diagnostics to learn the service type (e.g., Ethernet, Fibre Channel, OC-n), service configuration information (e.g., auto-negotiation parameters, link policing mode (i.e., pause enabled or disabled), port speed, and transmission mode (i.e., simplex or duplex)), and SLA parameters (e.g., EFS, SEFS committed information rate or CIR, peak information rate or PIR). To support such service diagnostics, the SMC 24 carries command-and-response messages.

Service Management Channel (SMC) Implementations

Implementations of the SMC include 1) a byte in the path overhead (POH) of SONET STS frames (or of SDH VC frames), and 2) client management frames of Generic Framing Procedure (GFP).

Path Overhead (POH) Implementation of SMC

Figure 7:
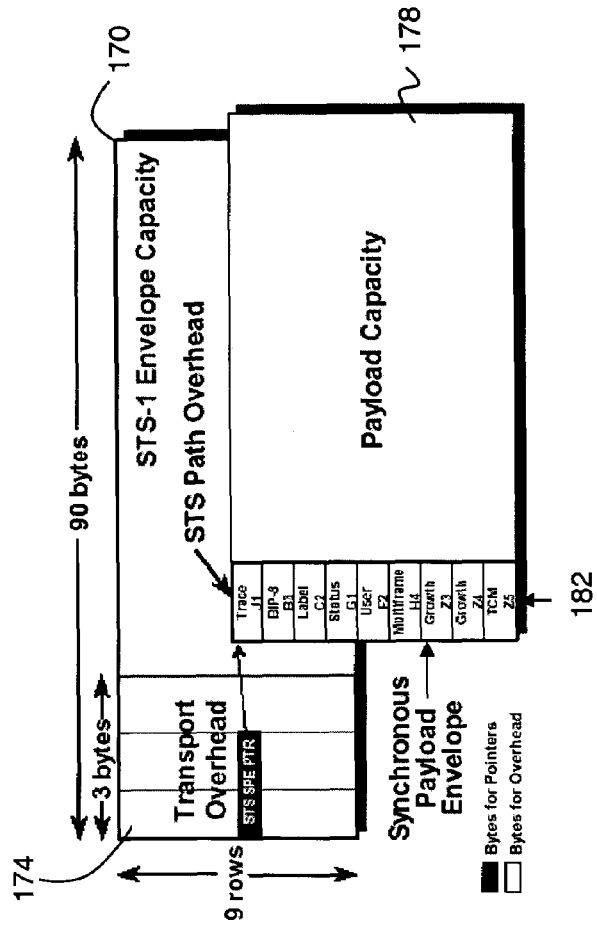
FIG. 7 is a diagram of a SONET synchronous transport signal (STS) frame.

FIG. 7 shows a SONET frame format, which is based on an STS-1 frame 170. The STS-1 frame 170 includes of a transport overhead 174 and a synchronous payload envelope (SPE) 178. The STS-1 frame has 810 bytes organized as 9 rows of 90 bytes. The first three bytes of each row (i.e., the first three columns of the STS-frame) are the transport overhead 174; the remaining 87 columns are the SPE 178. The first column 182 of the SPE 178, consisting of nine bytes, is the path overhead (POH). Path terminating equipment (e.g., the edge service and core service switches) use the POH to communicate various information. Each byte of the POH conveys a different type of information. In one embodiment (SONET), the SMC 24 is implemented in the Z3 byte of the POH (for SDH, the corresponding byte of the POH is the F3 byte). An advantage of using the POH for the SMC 24 instead of using the transport overhead (e.g., a byte in the line overhead or LOH or in the section overhead or SOH) is that information in the POH traverses network-to-network interfaces, whereas information in the LOH and SOH does not. A byte or bytes of the POH, other than the Z3 byte, can be used for the SMC 24 without departing from the principles of the invention.

Figure 8:
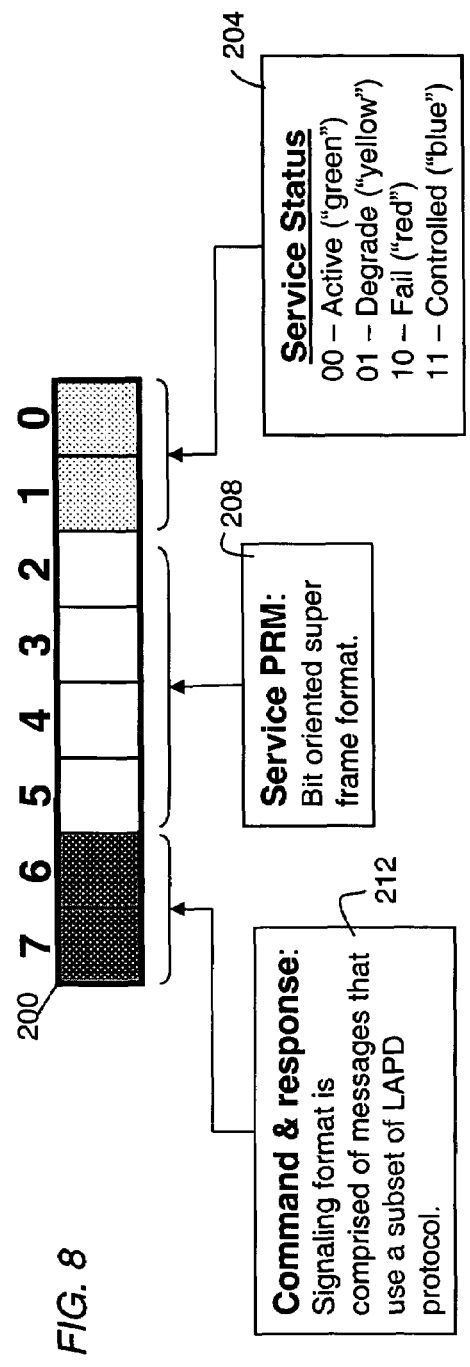
FIG. 8 is a diagram of a format for a POH byte used to implement one embodiment of the service management channel of the invention.

FIG. 8 shows an example assignment of bits in the POH byte 200 used to implement the SMC 24. The particular bit assignments described herein are for purposes of illustration. One skilled in the art will recognize that different bit assignments can be used to practice of the invention. Eight bits are used to define a two-bit service status field 204, a four-bit service PRM field 208, and a two-bit command-and-response field 212. The bits are labeled 0-7, with bit 0 least significant bit. Bits 0 and 1 define the two-bit service-status field 204. Table 1 corresponding service status for each combination of bit values in the service-status field 204.

TABLE 1

| Bit values | Service Status |
|---|---|
| 00 | Active |
| 01 | Degrade |
| 10 | Fail |
| 11 | Controlled |

An active service status indicates that the service is performing according to metrics set forth in the governing SLA. The service has a degrade status when the service is experiencing a degraded level of conformance to the SLA. In this case, the service is functioning properly, but encountering anomalies that are affecting the service. A fail status indicates SLA violations are occurring because of problems encountered at network elements of the carrier.

Edge service switches determine the value stored in the service-status field 204. Each ESS measures the service performance against service performance thresholds configured at that ESS. These performance thresholds are based on an SLA. The value placed in the service-status field 204 reflects the performance of the service against the performance thresholds. Each ESS also corelates near-end PRMs with far-end PRMs to produce end-to-end service performance reports. Core service switches continuously monitor the service-status field 204. Upon detecting a service degrade or fail condition, the service provider monitoring the service through the CSS can take reactive or proactive actions. These actions are taken by using the command-and-response subfield, described in more detail below.

Bits 2 through 5 define the four-bit performance report message field 208. As described in more detail below, one embodiment of a performance report message comprises a fixed-size 32-byte super-frame. An STS-1 frame is transmitted every 125 us, and 4 bits of the PRM with each STS-1 frame 170. Accordingly, a complete PRM is transmitted in 8 ms and 125 PRMs in one second. The information stored in each PRM repeats in each transmission until changed by the ESS generating the PRM.

Bits 6 and 7 define the two-bit command-and-response field 212. The signaling format is comprised of messages that use a subset of the Link Access Protocol—Channel D (LAPD) protocol. This field 212 supports a 16 Kbps message-oriented signaling format and bit-oriented signaling format.

Figure 9:
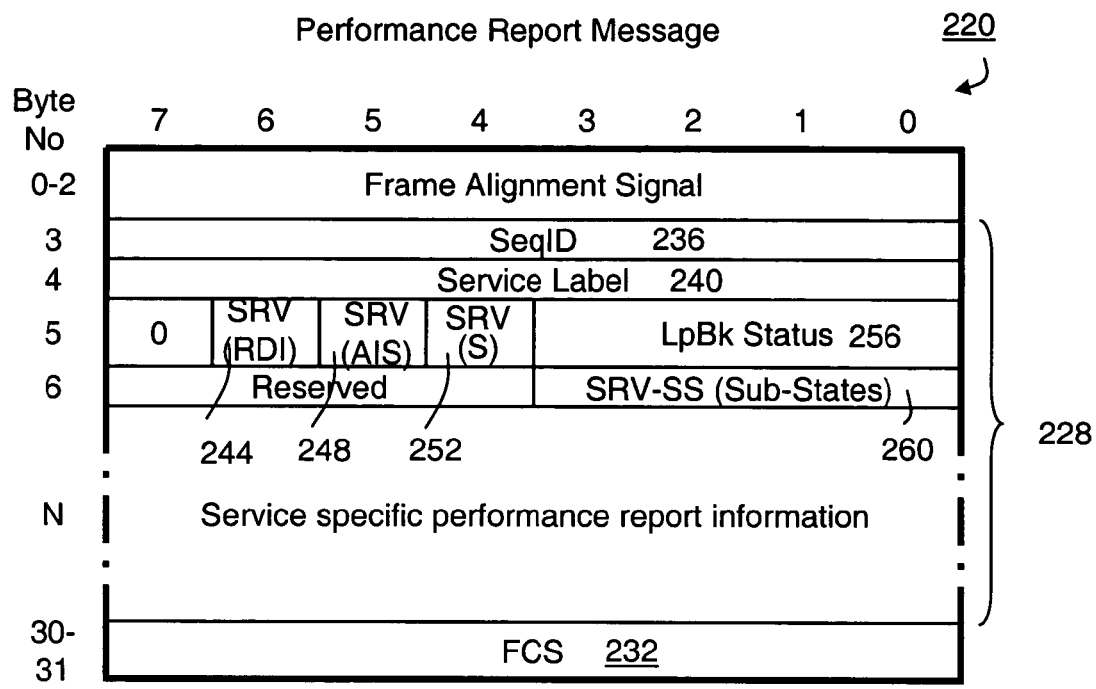
FIG. 9 is a diagram of a format of an embodiment of a service PRM super frame.

FIG. 9 shows an exemplary embodiment of a general format of a 32-byte service PRM super frame 220, including a frame-alignment-signal field 224, service-specific fields 228, and a frame-coding sequence or FCS field 232. Different formats than the one described herein can be used to practice of the invention. Bytes 0 through 2 comprise the frame alignment signal field. The frame alignment signal identifies the beginning of the PRM super frame 220. This 3-byte field has a hexadecimal value of FF FF FE. To ensure that a data pattern that matches the frame alignment signal does not occur within the body of the super frame 220, bits with a zero value are inserted at various positions in the super frame. For example, bit 7 of bytes 5, 8, 11, 14, 17, 20, 23, 26, and 29 are not considered part of the service-specific fields 228 and are always set to zero. No bit stuffing occurs when transmitting information in the super frame 220.

The service-specific fields 228 have a sequence-number (SeqID) field 236, a service-label field 240, a service remote-fault indication (RDI) field 244, a client-signal-failure field (AIS) 248, service-state field (S) 252, a loopback status (LpBk) field 256, and a service sub-states field 260. The sequence-number field 236 is an eight-bit field containing the sequence number identifying the super frame. In one embodiment, the sequence number ranges from 0 to 124, corresponding to the one hundred twenty-five super frames transmitted per second. A value of 0 indicates the start of a new second. The value in the field increments by 1 for each subsequent super frame.

The service-label field 240 is a 1-byte field. A set of service labels compose the service identifier. In one embodiment, the values stored in the service label field 240 for the first 32 transmitted super frames produce the service identifier. The service-remote-fault field 244 is a 1-bit field indicates whether a network adaptation failure (e.g., a GFP delineation error) has occurred at the ESS. The client-signal-failure field 248 is a 1-bit field indicating whether a signal failure occurred between the customer equipment and the ESS. The service-status field 252 is a 1-bit field that indicates whether the service is in-service (active) or out-of-service (deactivated). For example, a value of 0 indicates an active service, a value of 1 indicates deactivated. The loopback-status field 256 is a 4-bit field that indicates whether the far-end ESS is in loopback. Table 2 shows the corresponding interpretations for certain combinations of bit values in the loopback-status field 256.

TABLE 2

| LpBk value | Interpretation |
|---|---|
| 0000 | Loopback Deactivated |
| 0001 | Client Loopback active |
| 0010 | Link Loopback active |
| 0100 | Payload/path Loopback active |
| 1000 | Line Loopback active |

The service sub-state field 260 provides additional information about the status of the service. The interpretation of the value in the service sub-state field 260 depends upon whether the service is in-service or out-of-service (as indicated by the service state field 252) Table 3 and Table 4 below provide exemplary lists of in-service and out-of-service service sub-states, respectively, corresponding to the four-bit value in the service-status field 260. The particular service sub-states described therein are simply examples. One skilled in the art will recognize that different service sub-states and different value assignments can be used to practice of the invention.

TABLE 3

| SRV-SS value | In-service sub-state |
|---|---|
| 0000 | Normal (NR)<br>ESS is exhibiting normal in service behavior.<br>Capable and allowed to provide all service functions. |
| 0001 | Abnormal (ANR)<br>ESS is allowed to perform all provisioned service functions, but is capable of performing only part these functions or of performing these functions at a degraded level. |
| 0010 | Restricted (RST)<br>ESS is capable of performing all of its provisioned service functions but is intentionally suspended from performing part (but not all) of these functions. |
| 0011 | Abnormal and Restricted (ANRST)<br>ESS is capable of performing only part of its provisioned service functions or of performing these functions at a degraded level. ESS is also intentionally suspended from performing part of these functions. |

TABLE 4

| SRV-SS value | Out-of-service sub-state |
|---|---|
| 0000 | Autonomous (AU)<br>ESS is incapable performing any of its provisioned functions, and there is no external administrative restriction inhibiting the entity from performing these functions. |
| 0001 | Management (MA)<br>ESS is intentionally suspended by the external management command from performing all of its provisioned functions. |
| 0010 | Building (MA-BLD)<br>ESS is not yet in-service and is in a partial state of readiness to provide service to a customer. |
| 0011 | Testing (MA-TST)<br>ESS is built and potentially ready for service, but has not yet been tested. |
| 0100 | Ready (MA-RDY)<br>ESS ready, but no customers have been assigned to use this ESS yet. |
| 0101 | Tear-Down (MA-TRDN)<br>ESS not yet back to the installed dormant or potential state. |
| 0110 | Autonomous and Management (AUMA)<br>ESS is incapable from performing any of its provisioned service functions, and at the same time has been intentionally suspended from performing all of its provisioned service functions. |
| 0111 | Autonomous and Restricted (AURST)<br>ESS is incapable of performing any of its provisioned functions and at the same time being intentionally suspended from performing part of its provisioned functions. |
| 1000 | Management and Abnormal (MAANR)<br>ESS is operationally capable of performing only part of its provisioned service functions or at a degraded level, and at the same time is intentionally suspended from performing all of its provisioned functions. |

The other service-specific fields in the super frame 220 are determined by the particular service. Once per second, this service-specific PRM information becomes updated. When the service is deactivated, each ESS continues to dispatch service PRMs. These PRMs have information for the byte 5 service indicators (i.e., SRV-RDI, SRV-AIS, SRV-S, and LpBk status field), but no service performance report information.

Figure 10:
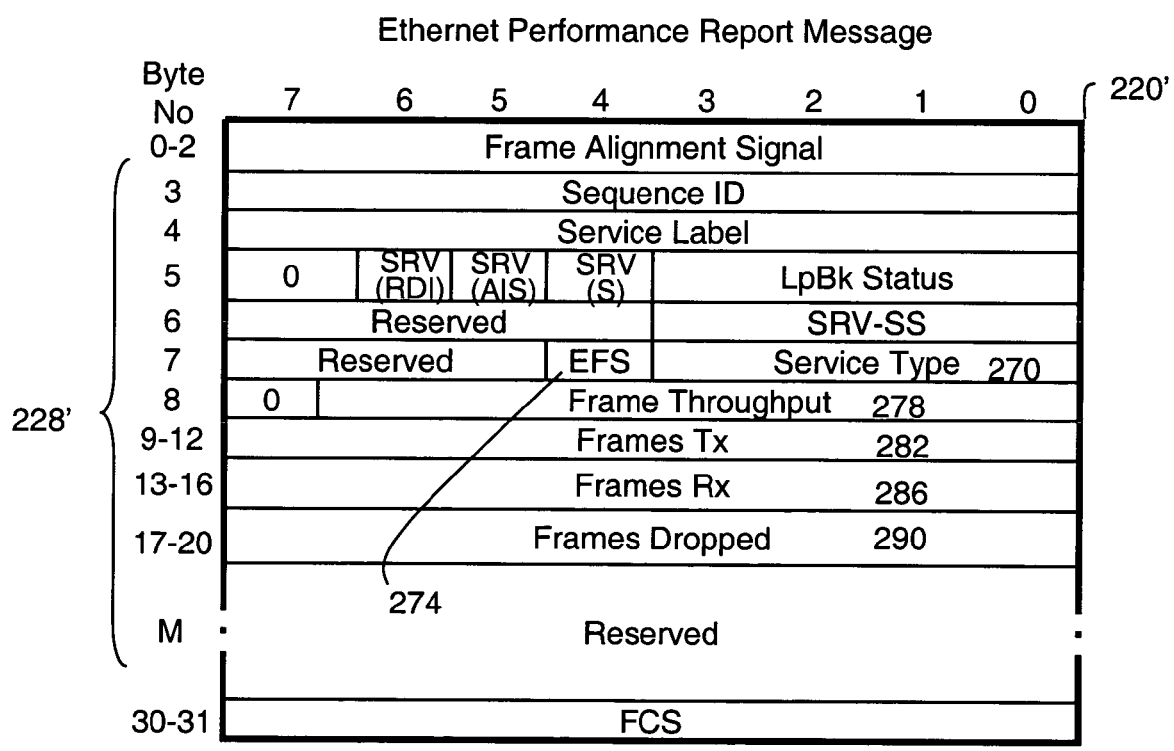
FIG. 10 is a diagram of a format of an embodiment of an Ethernet service PRM super frame.

FIG. 10 shows an embodiment of a super frame format 220' for an Ethernet service PRM. One of the bytes of the service-specific information fields 228' has a service-type field 270 and an errored-frame-second (EFS) field 274. Other service-specific fields 228' are a frame-throughput field 278, a frames-transmitted field 282, a frames-received field 286, and a frames-dropped field 290.

The service-type field 270 has four bits for representing the type of service with which the service PRM is associated. Table 5 shows the corresponding service type for each combination of bit values. One skilled in the art will recognize that other service types can be represented than those shown.

TABLE 5

| Service Type value | Interpretation |
|---|---|
| 0000 | Reserved |
| 0001 | OC-n |
| 0010 | Ethernet |
| 0011 | Fibre Channel |
| 0100 | Transparent |
| 0101 | Ds-n |
| 0110–1111 | Reserved |

The EFS field 274 is a 1-bit field indicating whether a frame error has occurred within a one-second interval. The percentage of frames dispatched to the network-facing interface (with respect to the CIR) is stored in the 7-bit frame-throughput field 278 (i.e., byte 8 of the super frame 220'). The frames-transmitted field 282 is a 30-bit field (in bytes 9 through 12) containing the number of Ethernet frames transmitted out of the customer-facing interface during the previous one-second interval. Bit 7 of the byte 11 is a zero bit. Located in bytes 13 through 16, inclusive, the frames-received field 282 is a 30-bit field containing the number of Ethernet frames received by the customer-facing interface during the previous one-second interval. Bit 7 of byte 14 is a zero bit. The number of Ethernet frames that were dropped at the customer-facing interface during the previous one-second interval appears in the frames-dropped field 290, a 30-bit field located in bytes 17 through 20, inclusive. Bit 7 of byte 17 and byte 20 are zero bits. The reserved fields can have network-side service performances metrics.

Figure 11:
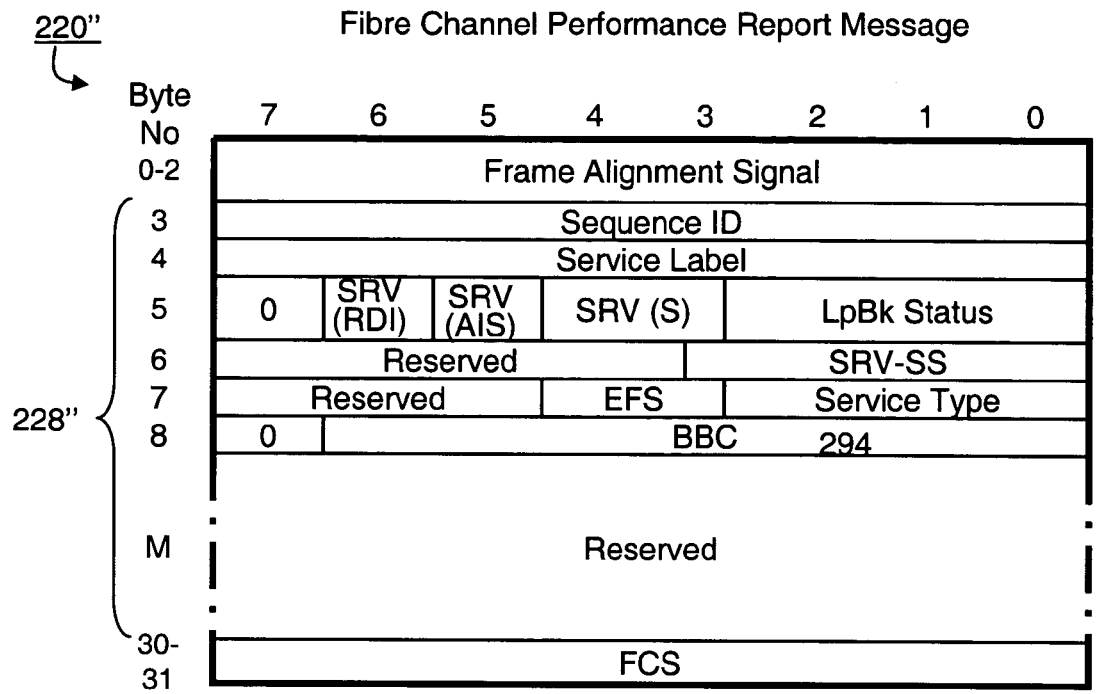
FIG. 11 is a diagram of a format of an embodiment of a Fibre Channel service PRM super frame.

FIG. 11 shows an embodiment of a PRM super frame 220" for a Fibre Channel service. Many of the fields in the Fibre Channel PRM are the same as those defined for the Ethernet PRM 220', such as the byte 5 service indicators, a service-type field and an errored frame second (EFS) field and the service sub-status field. The operations of these fields are the same as those defined for the Ethernet PRM. Unique to the Fibre Channel in the service-specific fields 228" is a buffer-to-buffer count (BBC) field 294, which contains a buffer-to-buffer count of the ESS at the end of a previous one-second interval. It is to be understood that the principles of the invention apply also to other types of services than those described, such as, but not limited to, OC-n service, DS-n service, and Managed Wavelength (transparent) service.

As described above, the command-and-response field 212 (FIG. 8) supports bit-oriented and message-oriented signaling. One type of message that uses bit-oriented signaling is a priority message. Priority messages do not elicit a response message. An embodiment of a format for priority messages is, in binary, 0xxxxxx0 11111111, where x indicates either a zero or one bit value. The rightmost bit is transmitted first. The string of eight consecutive "1" bits represents an abort signal for LAPD that permits unscheduled messages to interrupt the processing of scheduled messages. The six "x"-bits are a priority code that denotes the command conveyed by the priority message (64 different priority codes are possible).

Table 6 below shows an exemplary set of priority codes. Fewer, more, or different priority codes and commands can be used to practice the invention than those described in Table 6.

TABLE 6

| Priority Code | Command |
|---|---|
| 000001 | activate Line loopback |
| 000010 | deactivate Line loopback |
| 000011 | activate Payload/path loopback |
| 000100 | deactivate Payload/path loopback |
| 000101 | activate Link loopback |
| 000110 | deactivate Link loopback |
| 000111 | activate Client loopback |
| 001000 | deactivate Client loopback |
| 001001 | Activate service |
| 001010 | Deactivate service |
| 001011 | Set SRV-AIS |
| 001100 | Clear SRV-AIS |
| 001101 | Set SRV-RDI |
| 001110 | Clear SRV-RDI |

The activate-service command activates the service at the ESS. In addition, this command establishes the client link (i.e., between the customer equipment and the ESS). The deactivate-service command causes the ESS to change its service configuration state to deactivated. The deactivate-service command also takes down the client link. For example, for an Ethernet service, the ESS can send an invalid 8B/10B code to the customer equipment or dispatch the appropriate Ethernet OAM frame. The set-SRV-AIS and set-SRV-RDI commands take down the client link. The clear-SRV-AIS and clear-SRV-RDI commands establish the client link. The ESS can establish the client link by initiating an auto-negotiation procedure to the customer equipment. The service query command requests the ESS to respond with a service report.

When a service switch (either edge or core service switch) sends a priority message to an ESS, the service switch that sends the priority message can determine that the receiving ESS has recongnized and processed the priority command by examining the service PRMs that the ESS is dispatcing. For example, if a CSS sends a priority message to an ESS for activating loopback, the CSS can examine the loopback-status field 256 (FIG. 9) in the service PRM of the ESS to verify that the ESS is in a loopback state.

Figure 12:
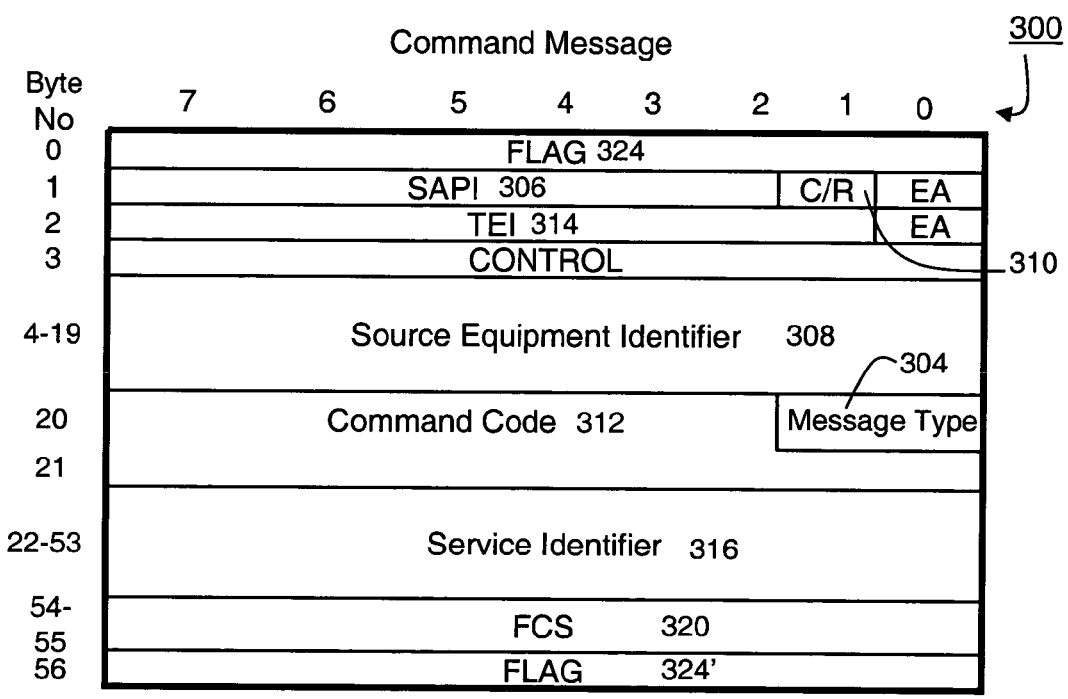
FIG. 12 is a diagram of a format of an embodiment of a command message.

The second type of command-and-response messages is message-oriented signals. Message-oriented signals use a LAPD messaging format. An example of a message-oriented signaling format is Q.291/LAPD. FIG. 12 shows an embodiment of a command message format 300. The format 300 includes a two-bit message type field 304. Table 7 shows the corresponding message type for each possible combination of bit values in the message-type field 304.

TABLE 7

| Bit values | Message Type |
|---|---|
| 00 | Reserved |
| 01 | Command |

TABLE 7-continued

| Bit values | Message Type |
|---|---|
| 10 | Response |
| 11 | OAM |

For command messages, the value stored in the message type field 304 is set to indicate a command. In one embodiment, the command message 306 includes 57 bytes. The first and last bytes 302, 302' are frame delimiters (storing a 7E hexadecimal value). The second byte (numbered as byte 1) has a 6-bit service access point identifier (SAPI) field 306, a one-bit command/response (C/R) field 310, and a one-bit an address field extension (EA) field 318. The next byte of the command message 300 has a terminal endpoint identifier (TEI) 314 (set to zero) and another address field extension field 318 (set to zero).

The identity of the network element that originates the command message occurs in a 16-byte source-equipment-identifier (SEI) field 308. A command code stored in a 14-bit command-code field 312 identifies the type of command and a 32-byte label stored in a service-identifier field 316 denotes the service instance.

The command message 300 also has an FCS field 320. The ESS that produces a LAPD message generates the FCS and zero stuffing. For LAPD, zero stuffing entails inserting a zero after any sequence of five consecutive ones. Zero stuffing prevents the occurrence of a particular flag pattern (i.e., 01111110) in the bits between the opening and closing flags of a Q.291/LAPD frame. The receiver of the message removes a zero following five consecutive ones.

Table 8 below shows an exemplary set of commands codes corresponding to command codes stored in the command-code field 312. Fewer, more, or different commands and bit value assignments can be used to practice the invention.

TABLE 8

| Command Code | Command |
|---|---|
| 000001 | Service Query |
| 000010 | Client Status |
| 000011 | Get Service ID |
| 000100 | Set Service ID |
| 000101 | Set Service State |
| 000110 | Set Service Info |
| 000111 | Clear Service OMs |
| 001000 | Get Service OMs |
| 001001 | Ping Request |
| 001010 | Trace Path |
| 001011–11 . . . 1111 | Reserved |

Upon receiving a service query command, an ESS generates a service report in response. Service reports are response messages, the contents of which are service specific. FIG. 13 shows an embodiment of an Ethernet service report 330. Table 9 shows the various fields of the service report format and the function of the fields.

TABLE 9

| Field | Function |
|---|---|
| destination equipment identifier (DEI) | identifies the destination network element of the response message |
| service identifier | identifies the service instance |
| message-type | indicates that the type of message is response |
| service type | indicates that the type of service is Ethernet |
| rate status | Indicates the client interface rate at the edge service switch (e.g., 10 M, 100 M, 1 G) |
| service status | Indicates active or deactivated |
| loopback status | Indicates deactivated or active client, link, payload or line loopback |
| pause status | Indicates pause status of service (enabled or disabled) |
| duplexity status | Indicates duplexity status of service (Full or Half) |
| committed information rate (CIR) | 2-byte field indicates configured CIR at the edge service switch. Units are megabytes. |
| peak information rate (PIR) | 2 byte field indicates the configured PIR at the edge service switch. Units are megabytes. |
| burst duration Unit (BDU) | Indicates units of measure of burst duration (seconds, millisecond, or microseconds) |
| burst duration | Indicates duration of client signal bursting. The 14-bit field permits more than 16,000 burst duration units. |

FIG. 14 shows an embodiment of a format for a Fibre Channel service report 340. The fields are similar to that of the Ethernet service report with the following noted differences. For the Fibre Channel service report 340, the rate status field 342 indicates possible client interface rates of 100M, 1 G, or 2 G. For Ethernet, the options are 10M, 100M and 1 G. Also, the Fibre Channel service report 340 includes a provisioned buffer credits (PBC) field 346 to indicate the number of buffer credits provisioned at the ESS. It is to be understood that other types of services, such as an OC-n service, a DS-n service, and a Managed Wavelength (transparent) service, use similar fields as those described and fields that are unique to that service. Also, other embodiments of the Ethernet and Fibre Channel service reports 330, 340 can have different fields and functions than those described.

Generic Framing Procedure (GFP) Implementation of SMC

As described above, the SMC can also be implemented using client management frames of the generic framing procedure (GFP). A client management frame is a GFP frame containing information associated with the management of the GFP connection between the GFP source and the GFP sink or with the management of the client signal. The GFP implementation of the SMC supports the service alarm indications (AIS and RDI) and service performance monitoring described above. SMC capabilities unsupported by the GFP implementation include service monitoring by a CSS, non-8B/10B coded client services, and priority and command-and-response messages.

To support the AIS signal, the currently defined GFP CSF is used. The GFP CSF can indicate a loss of client signal or loss of client character synchronization. To support the RDI signal, extensions to the GFP client management frame type definitions are provided. A user payload indicator (UPI) is defined for this purpose. TABLE 10 below defines the GFP client management frame payload uses for various UPI values. The particular payload uses and UPI values described therein are for purposes of illustrating the principles of the invention. One skilled in the art will recognize that different payload uses and different UPI values than those described in Table 10 can be used to practice of the invention.

TABLE 10

PTI (Payload Type Indicator) = 100

| UPI value | Usage |
|---|---|
| 0000 0000 | Reserved |
| 0000 0001 | Client Signal Fail (Loss of Client Signal) |
| 0000 0010 | Client Signal Fail (Loss of Character Synchronization) |
| 0000 0011 | Remote Fault Indicator (RFI) |
| 0000 0100 | Service Performance Report (SPR) |
| 0000 0101 through 1111 1110 | Unused |
| 1111 1111 | Reserved |

A GFP RFI is dispatched by an ESS in the upstream direction when a loss of GFP frame delineation is detected on the incoming optical signal. Each ESS dispatches a service PRM periodically (e.g., once per second). The GFP SPR is used to dispatch the service PRM and is formatted such that the Payload Type Indicator (PTI) equals 100 (in binary), the UPI equals 0000 0100 (in binary), and the Payload Length Indicator (PLI) indicates the number of bytes in the GFP payload area (which does not denote GFP control frames). The GFP SPR client payload information field includes fields for errored seconds (ES), severely errored seconds (SES), and service state (SS).

Examples of SMC Operation

The OBS framework of the invention can support various network configurations. One such network configuration 10" appears in FIG. 15. The network configuration 10" is an example embodiment of the optical network 10 shown in FIG. 2. In this network configuration, a single carrier supports a service (e.g., an Ethernet Private Line service) over a single transport domain. Consider that customer traffic gains access to the optical network 10" and to the service at the ESS 14 through the client interface 22. The traffic traverses the transport facility 26 to the other service termination point, ESS 18, from which the traffic is delivered to the customer through the client interface 28. Consider also that a network operator 348, who has access to the ESS 14 through a computer system 348, desires to commission the service, but before commissioning the service desires to verify the connectivity of the optical network 10".

Figure 15:
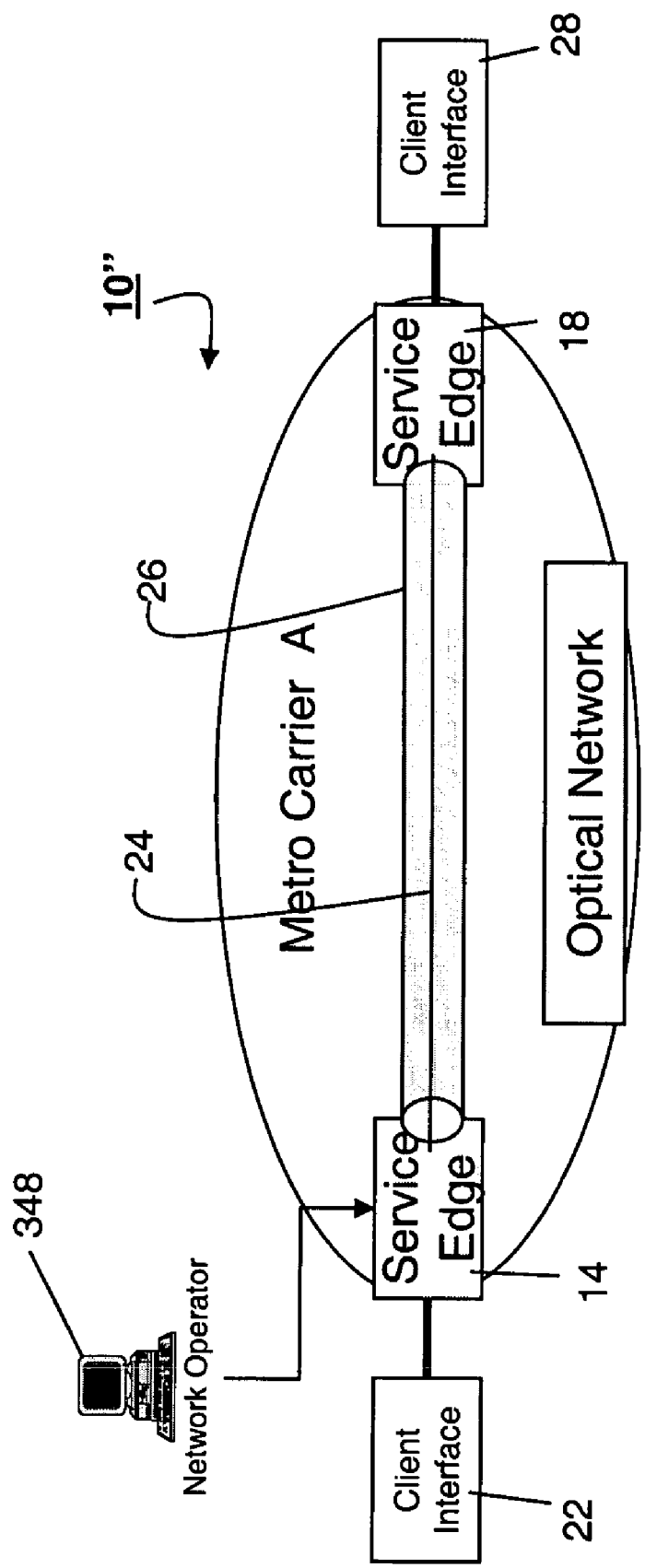
FIG. 15 is a diagram of a network configuration of a network supported by a single carrier over a single transport domain.
Figure 16:
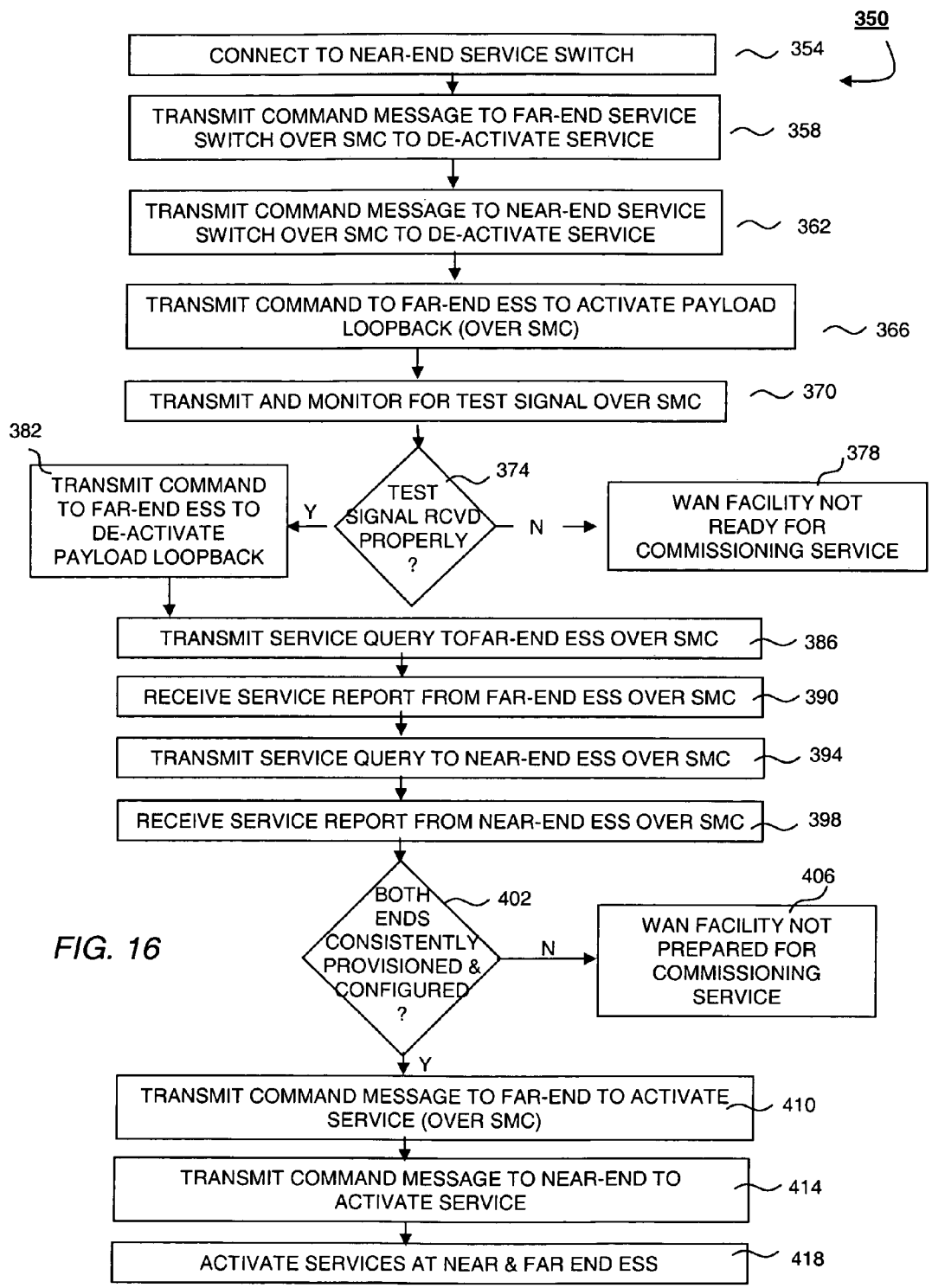
FIG. 16 is a flow diagram illustrating an embodiment of a process for commissioning an Ethernet Private Line service for a single carrier over a single transport domain in accordance with the principles of the invention.

FIG. 16 shows an embodiment of a process 350 for commissioning a service within the network and administrative domain of the single service provider, of FIG. 15. At step 354, the network operator establishes communication with the ESS 14. For the purpose of this example, the accessed ESS is referred to as the near-end service switch and the ESS 18 at the other end of the service is the far-end service switch. The network operator then causes a command message to be sent (step 358) to the far-end switch 18 over the SMC 24 to deactivate the service. Similarly, a command message is sent (step 362) to the near-end service switch 14. When the near-end and far-end switches receive the respective command, each responds by setting its service state to deactivate and by initiating shut down procedures for the client link. For example, each service switch can send an invalid 8B/10B code to shut down the client link. As a result, the service is deactivated.

At step 366, the network operator causes a command to be sent over the SMC 24 to the far-end service switch to activate payload loopback. In response to the command, the far-end service switch enters a service loopback condition. Then the network operator transmits and monitors for (step 370) a test signal. If, at step 374, the test signal is received properly, connectivity to the far-end SONET/SDH WAN facility is verified. The network operator then transmits (step 382) a command to the far-end service switch 18 to deactivate the payload loopback condition. This causes the far-end service switch 18 to remove the loopback condition. If, at step 374, the test signal is not received properly, the transport facility is ready (step 378) for the commissioning of the service.

After connectivity is verified, the network operator transmits (step 386) a service query command over the SMC to the far-end service switch. The far-end service switch 18 responds with a service report (here, an Ethernet service report, see FIG. 10), which the network operator is able to monitor when received (step 390) at the near-end service switch 14. Similarly, the network operator issues (step 394) a service query command to the near-end service switch 14 and receives (step 398) a service report produced by the near-end service switch 14 in response. From the service reports, the network operator determines (step 402) whether both ends of the service are consistently provisioned (i.e., configured). If the provisioning is inconsistent, the WAN facility is unprepared (step 406) for the commissioning of the service. If the service reports show consistent provisioning, the network operator transmits (steps 410 and 414) a command over the SMC 24 to the far-end service switch 18 and another command to the near-end service switch 14 to activate the service. In reply, each switch 14, 18 changes (step 418) its service state to activated and establishes a client link (e.g., by initiating auto-negotiation procedures). The Ethernet Private Line service is thus prepared for Customer traffic.

Figure 17:
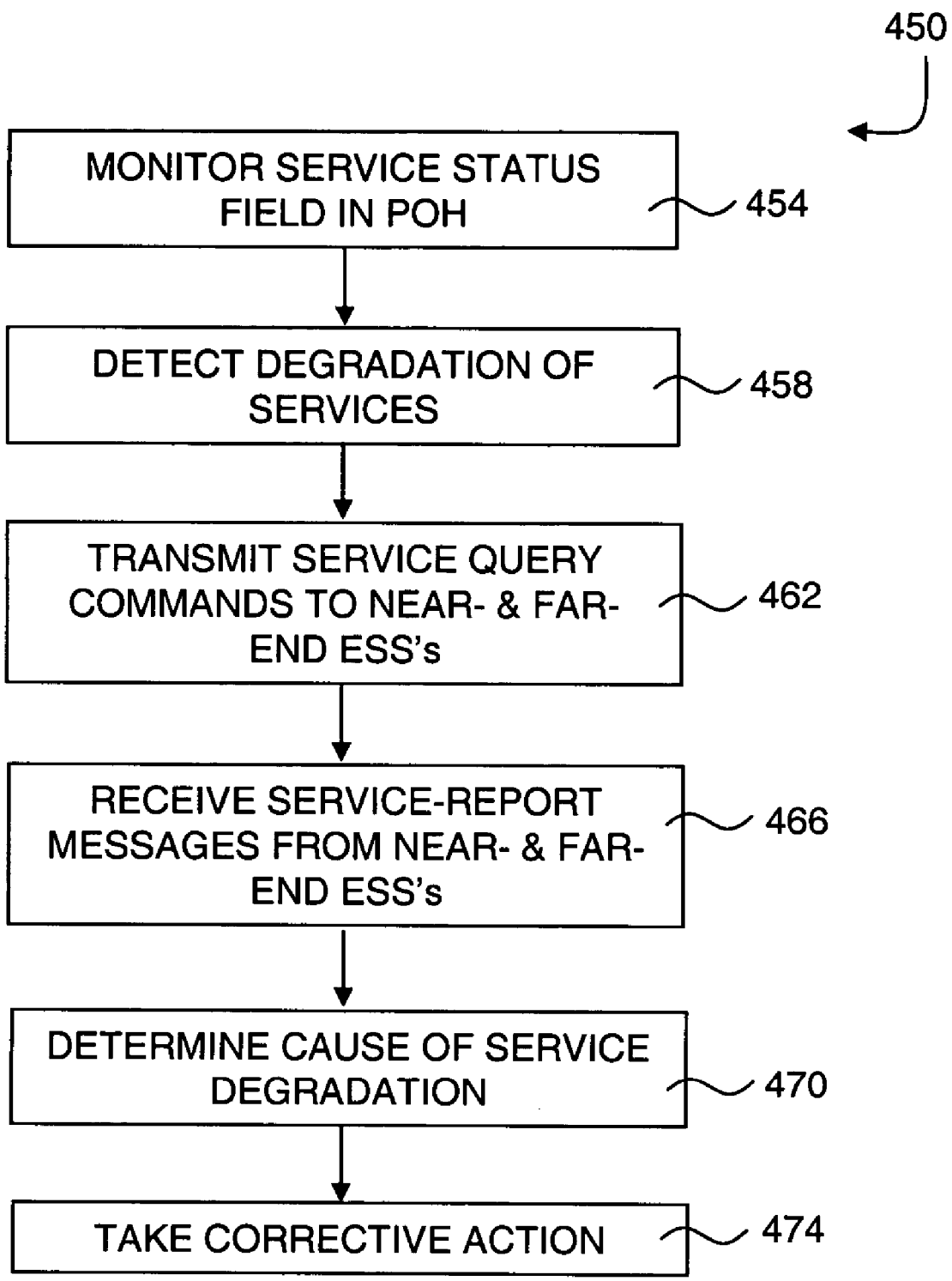
FIG. 17 is a flow diagram illustrating an embodiment of a process for diagnosing service degradation in accordance with the principles of the invention.

FIG. 17 shows an embodiment of a process 450 for diagnosing service degradation in a network and administrative domain of a single service provider, of FIG. 15. At step 454, a network operator accesses one of the ESSs 14, 18 and monitors the service-status field 204 of the SMC 24 (in one embodiment, the Z3 byte of the POH). For the purpose of this example, the accessed ESS is referred to as the near-end service switch and the ESS at the other end of the service is the far-end service switch. Consider that the service-status field 204 of the POH byte indicates a degradation of services (step 458). Then, the network operator sends (step 462) service-query commands to the near-end service switch and to the far-end service switch over the SMC 24. In response to the commands, each ESS 14, 18 produces (step 466) a corresponding service report message.

From the service reports, the cause of the service degradation is determined (step 470). For example, the network operator discovers that the far-end packet drop count is excessive and that the cause is that the near-end CIR is misconfigured: the CIR of the near-end service switch exceeds the rate status of the far-end service switch. Accordingly, the network operator takes (step 474) appropriate corrective action, such as deactivating and reconfiguring the service.

Figure 18:
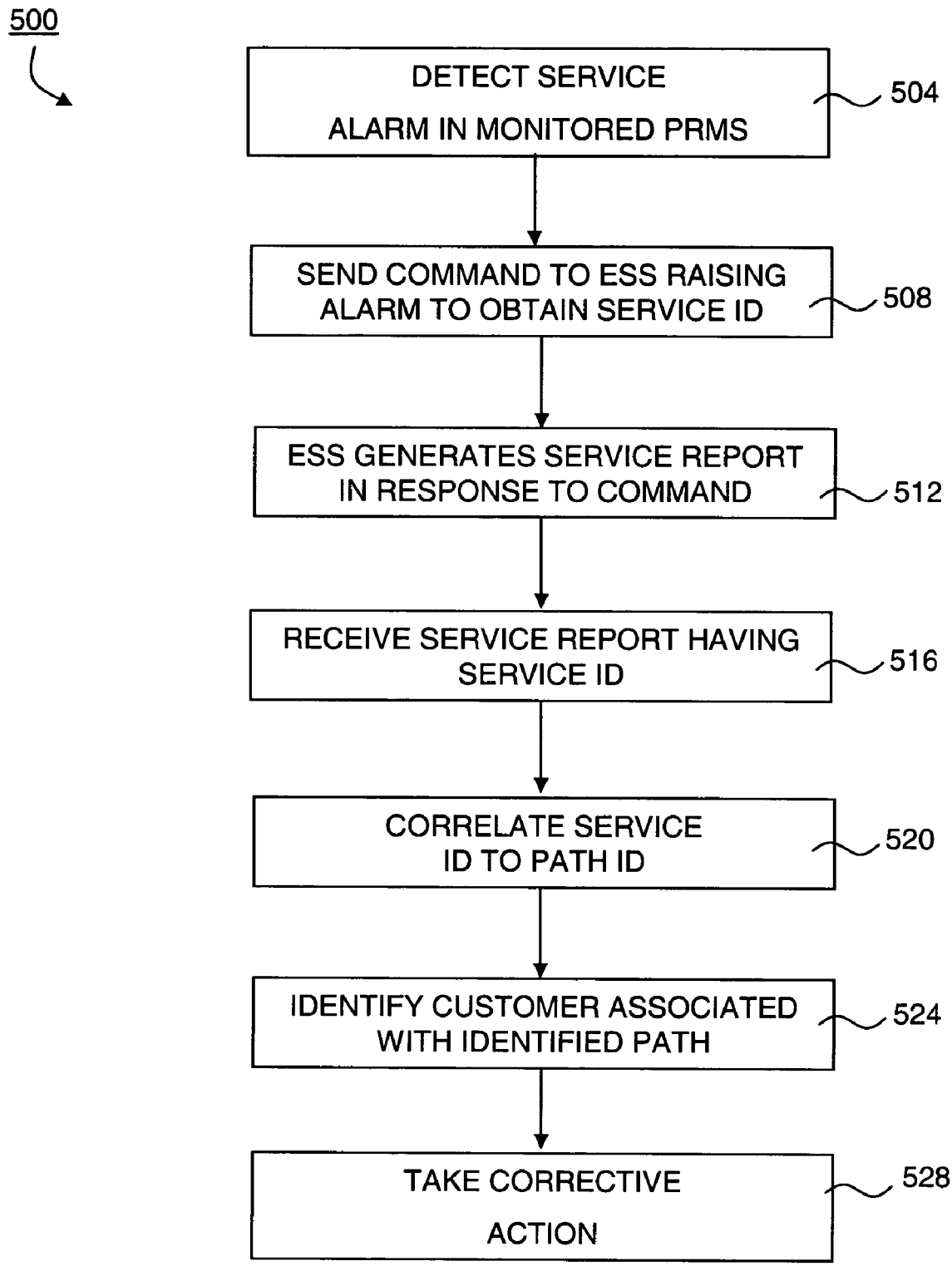
FIG. 18 is a flow diagram illustrating an embodiment of a process for identifying and alerting a customer potentially affected by degradation in service.

FIG. 18 shows another example of a process 500 illustrating a diagnostic capability provided by the SMC of the invention. In the process 500, a service provider is able to proactively institute corrective action in response to indications that its service is degrading. This exemplary process is described in the context of a network and administrative domain of a single service provider, of FIG. 15.

Consider that in the process of monitoring PRMs generated by the ESSs 14, 18 and transmitted over the SMC 24, the service provider notices (step 504) that a service alarm has been raised. To investigate further, the service provider sends (step 508) a command (e.g., a service-query command or a get-service-ID command) to the ESS that raised the alarm. The ESS receiving the command produces (step 512) a response (i.e., a service report) that has the service identifier. The service provider receives (step 516) the response and correlates (step 520) the service ID to a path ID associated with the dedicated circuit supporting the service. From the path ID, the service provider identifies (step 524) the customer(s) that may be affected by a degradation of the service. For the purpose of these correlations, the ESS's maintain databases or tables that associate service IDs with paths IDs and path IDs with customers. Accordingly, the service provider takes (step 528) proactive corrective action to remedy or mitigate the condition causing the alarm or to alert the customer of the potential problem with the service, or combinations thereof.

Figure 19:
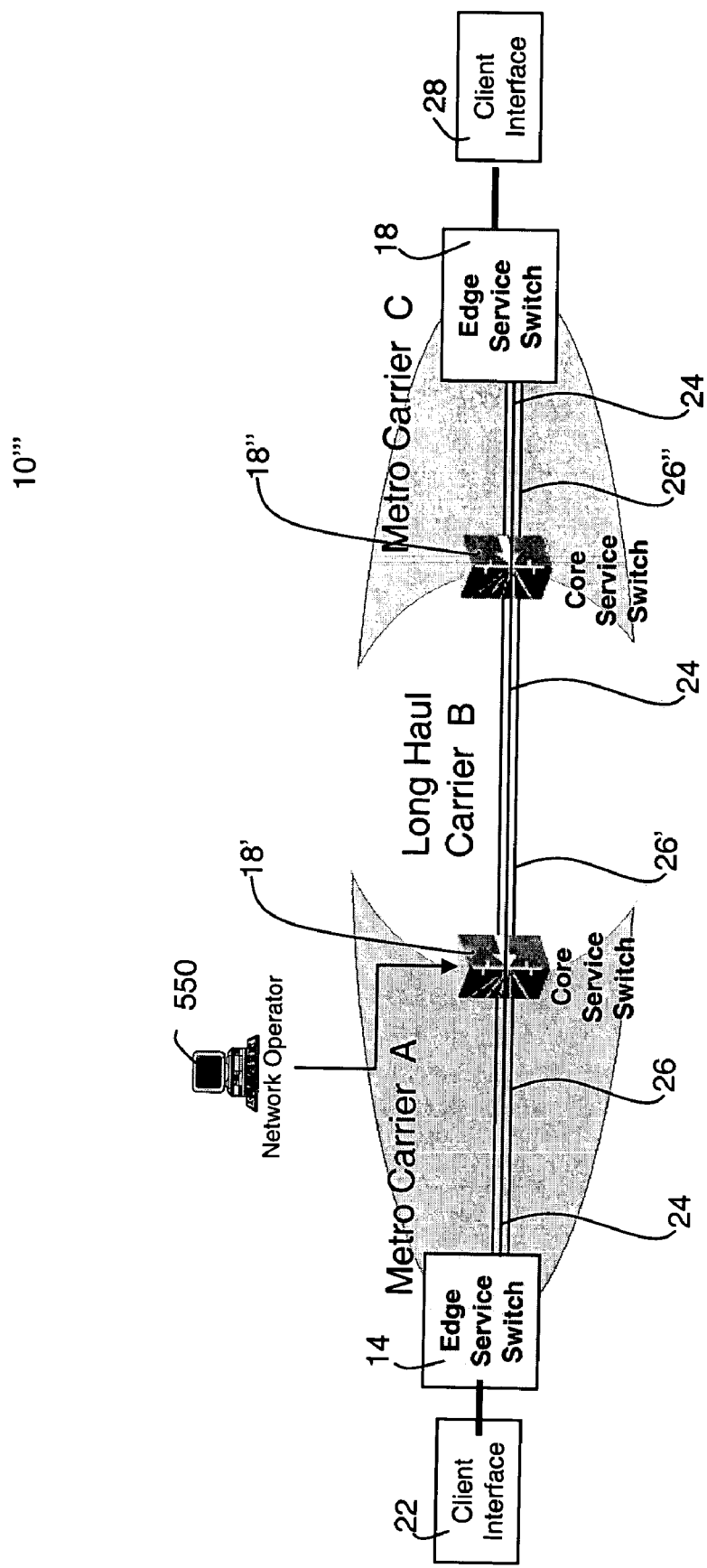
FIG. 19 is a diagram of a network configuration of a network carrying a service supported by multiple carriers over multiple transport domains.

The various processes 350, 450, and 500 described above are examples of capabilities given to service providers to manage their service. These examples and other capabilities are not limited to single service providers or to single transport domains. FIG. 19 shows another example of a network configuration 10'''. In this network configuration 10''', multiple carriers support a service (e.g., an Ethernet Private Line service) over multiple transport domains. Consider that customer traffic gains access to the optical network 10''' and to the service at the ESS 14 through the client interface 22. The traffic traverses the transport facility 26 of Metro Carrier A to the CSS 18'. Through a network inter-connect device (not shown), the CSS 18' hands-off the customer traffic to the transport facility 26' of Long Haul Carrier B. The traffic passes to a CSS 18'', then over the transport facility 26'' of Metro Carrier C to the other service termination point, ESS 18. The traffic is then delivered to the customer through the client interface 28. This network configuration 10''' represents a typical scenario in which Metro Carrier A and Metro Carrier C are private line wholesalers, and Long Haul Carrier B is a private line retailer. Using the SMC, all carriers can monitor the end-to-end service status (e.g., active, degrade, or failure). In general, any of the carriers can gather service state information, even if the ESS 14, 18 is not part of that carrier's network.

Figure 20:
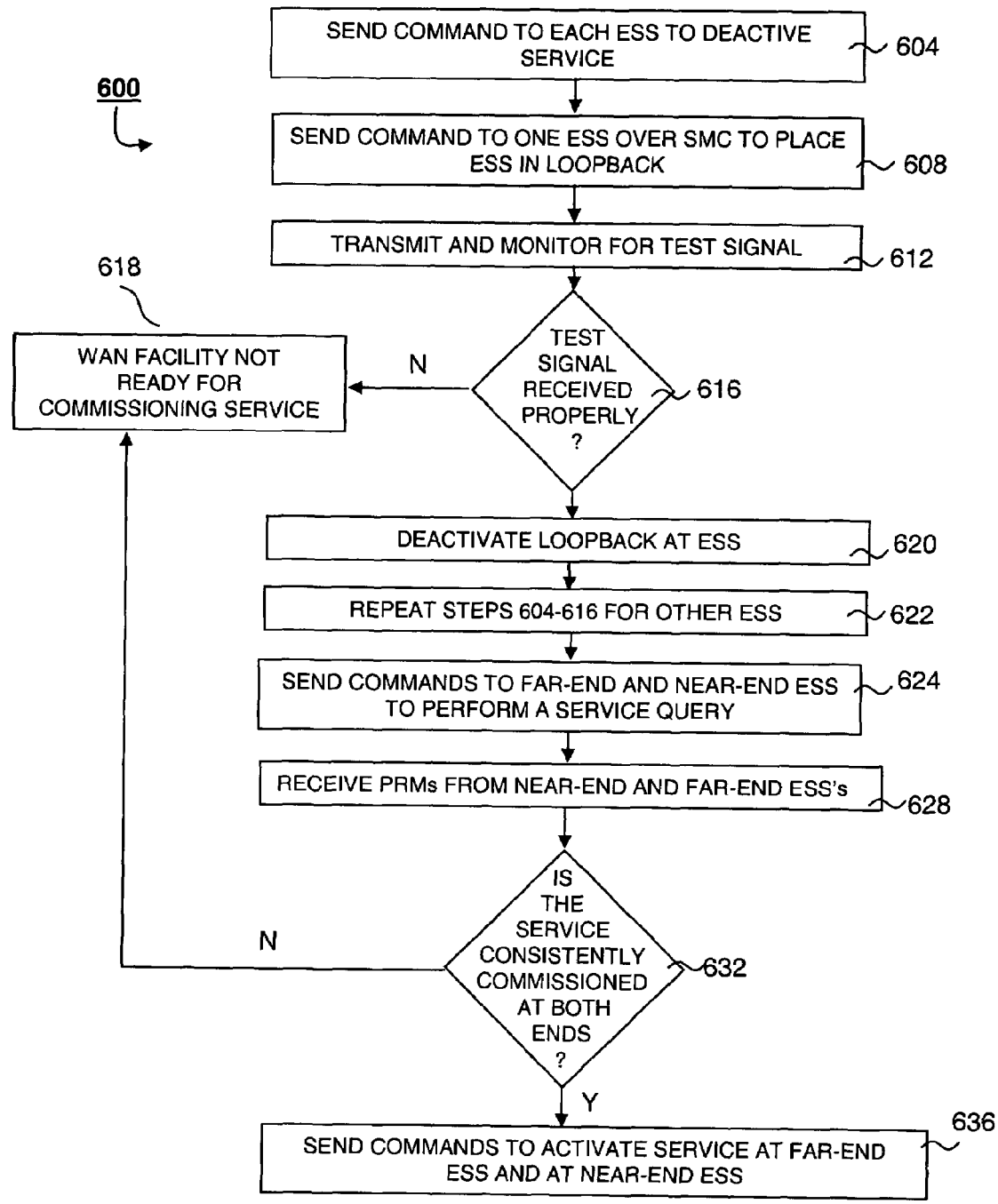
FIG. 20 is a flow diagram illustrating an embodiment of a process for commissioning a Private line service involving multiple carrier networks in accordance with the principles of the invention.

Consider that a network operator, who has access to the CSS 18' through a computer system 550, desires to commission the service across the networks of the three carriers. FIG. 20 shows an embodiment of a process 600 for commissioning the service across multiple carrier networks. For this example, consider also that Metro Carriers A and C allow Long Haul Carrier B to perform "passive" and "non-passive" SMC operations within their networks. Passive SMC operations are those that request service state information, but do not change any service state information. Non-passive SMC operations change service state information.

To commission the service, the network operator at carrier B sends (step 604) commands over the SMC to both ESS 14, 18. When each ESS 14, 18 receives its respective command, each responds by setting its service state to deactivate and by initiating shut down procedures for its client link. Then, the network operator sends (step 608) a command over the SMC 24 to the ESS 18 in the carrier C network to enter the payload loopback condition. In response to the command, the ESS 18 enters a service loopback condition. The network operator then transmits and monitors for (step 612) a test signal. If, at step 616, the test signal is received properly, connectivity to the ESS 18 facility is verified. The network operator then transmits (step 620) a command to the far-end switch 18 to deactivate payload loopback, which causes the far-end switch 18 to remove the loopback condition. If the test signal is not received properly, the WAN facility is unprepared (step 618) for commissioning the service. The network operator can then similarly verify (step 622) connectivity to the ESS 14 of Metro Carrier A.

After connectivity is verified, the network operator transmits (step 624) a service-query over the SMC to each of the ESSs 14, 18. Each ESS 14, 18 responds with a service report, which the network operator receives (step 628) at the CSS 18'. The destination equipment identifier in each service report identifies the CSS 18' as the destination service switch.

The network operator at the CSS 18' determines (step 632) from the received service reports whether both ends of the service are consistently provisioned (i.e., configured). If the provisioning is inconsistent, the WAN facility is not ready (step 618) for the commissioning of the service. If the service reports show consistent provisioning, the network operator transmits (step 636) a command over the SMC 24 to the ESS 18 and another command to the ESS 14 to activate the service. In reply, each ESS 14, 18 changes (step 640) its service state to activate and establishes a client link (e.g., by initiating auto-negotiation procedures). Consequently, the service is prepared to carry customer traffic.

While the invention has been shown and described with reference to specific preferred embodiments, it should be understood by those skilled in the art that various changes in form and detail may be made therein without departing from the spirit and scope of the invention as defined by the following claims.

What is claimed is:

1. A network element connected at one end of a dedicated circuit used to carry customer traffic associated with a service, the network element comprising:

a client interface receiving client signals from a client network;

a service management channel entity deriving from the client signals service-specific information related to a performance of the service and generating a message in response to the service performance information, the message identifying the service to which the service performance information in the message pertains; and a transport interface for mapping and adapting the client signals to an optical transport facility, the transport interface transmitting the message to a network element at the other end of the dedicated circuit over a service management channel capable of carrying the message across a network-to-network interface.

2. The network element of claim 1, wherein the service management channel includes a byte of a path overhead of an optical transmission frame.

3. The network element of claim 2, wherein the optical transmission frame is a Synchronous Optical Network (SONET) frame and the byte of the path overhead is a Z3 byte.

4. The network element of claim 2, wherein the path overhead byte has bits for conveying a status of the service and bits for conveying the message.

5. The network element of claim 4, wherein the path overhead byte further comprises bits for conveying commands and responses.

6. The network element of claim 1, wherein the service management channel includes a header in a Generic Framing Procedure client management frame.

7. The network element of claim 6, wherein the header includes a payload type indicator (PTI) field and a user payload indicator (UPI) field, and wherein the header indicates that the Generic Framing Procedure client management frame contains the message when the PTI and UPI fields contain certain predefined values.

8. The network element of claim 1, wherein the message is one of a command message, a response to a command message, a service performance report message, and a priority code message.

9. The network element of claim 1, wherein the service is one of an asynchronous service, a synchronous service, a local area network service, a storage area network service, and a managedwavelength service.

* * * * *

UNITED STATES PATENT AND TRADEMARK OFFICE
CERTIFICATE OF CORRECTION

PATENT NO. : 7,499,407 B2
APPLICATION NO. : 10/666372
DATED : March 3, 2009
INVENTOR(S) : Holness et al.

It is certified that error appears in the above-identified patent and that said Letters Patent is hereby corrected as shown below:

In the specification, Column 12, line 30, insert --being the-- after "bit 0".

In the specification, Column 12, line 32, insert --shows the-- after "Table 1".

In the specification, Column 12, line 58, change "corelates" to --correlates--.

In the specification, Column 13, line 45, insert --that-- after "1-bit field".

In the specification, Column 13, line 48, insert --has-- after "failure".

In the specification, Column 15, line 3, change "field" to --fields--.

In the specification, Column 16, line 46, change "recongnized" to --recognized--.

In the specification, Column 16, line 47, change "dispatcing" to --dispatching--.

In the claims, Claim 9, Column 24, line 15, change "managedwavelength" to --managed wavelength--.

Signed and Sealed this

Sixth Day of October, 2009

David J. Kappos
*Director of the United States Patent and Trademark Office*